United States Patent
Veselinovic et al.

(10) Patent No.: US 12,519,438 B2
(45) Date of Patent: Jan. 6, 2026

(54) SYSTEM AND METHOD FOR AUTOMATIC ADJUSTMENT OF REFERENCE GAIN

(71) Applicant: Shure Acquisition Holdings, Inc., Niles, IL (US)

(72) Inventors: Dusan Veselinovic, Chicago, IL (US); Michael Ryan Lester, Colorado Springs, CO (US)

(73) Assignee: Shure Acquisition Holdings, Inc., Niles, IL (US)

( * ) Notice: Subject to any disclaimer, the term of this patent is extended or adjusted under 35 U.S.C. 154(b) by 582 days.

(21) Appl. No.: 18/062,876

(22) Filed: Dec. 7, 2022

(65) Prior Publication Data

US 2023/0223907 A1 Jul. 13, 2023

Related U.S. Application Data

(63) Continuation of application No. 17/169,262, filed on Feb. 5, 2021, now Pat. No. 11,552,611.

(Continued)

(51) Int. Cl.
*H04M 9/08* (2006.01)
*H03G 3/24* (2006.01)
(Continued)

(52) U.S. Cl.
CPC .............. *H03G 3/24* (2013.01); *H04M 9/08* (2013.01); *H04R 3/005* (2013.01); *H04R 5/04* (2013.01); *H04S 7/301* (2013.01); *H04S 2400/13* (2013.01)

(58) Field of Classification Search
CPC .......... G10L 2021/02082; G10L 21/02; H04M 9/08; H04M 9/09
See application file for complete search history.

(56) References Cited

U.S. PATENT DOCUMENTS 1,535,408 A 4/1925 Fricke
1,540,788 A 6/1925 McClure
(Continued)

FOREIGN PATENT DOCUMENTS

AU 2004200802 3/2004
CA 2359771 4/2003
(Continued)

OTHER PUBLICATIONS

Symetrix, Inc., SymNet Network Audio Solutions Brochure, 2008, 32 pgs.

(Continued)

*Primary Examiner* — Ping Lee
(74) *Attorney, Agent, or Firm* — Neal, Gerber & Eisenberg LLP (57) ABSTRACT

Systems and methods are provided for automatically adjusting a reference gain of an audio mixer having a reference channel for receiving a far end audio signal from a remote location as a reference signal and a plurality of audio input channels for receiving audio signals captured by a plurality of microphone element. An exemplary method includes determining an echo level in an input audio signal received at a given audio input channel, and automatically determining a gain amount for the reference channel based on the echo level. An exemplary system includes a reference gain adjuster configured to automatically determine a gain amount for the reference channel based on an echo level detected in an input audio signal received at a given audio input channel.

17 Claims, 3 Drawing Sheets

Related U.S. Application Data (60) Provisional application No. 62/971,850, filed on Feb. 7, 2020.

(51) Int. Cl.
*H04R 3/00* (2006.01)
*H04R 5/04* (2006.01)
*H04S 7/00* (2006.01)

(56) References Cited

U.S. PATENT DOCUMENTS

| | | |
|---|---|---|
| 1,965,830 A | 7/1934 | Hammer |
| 2,075,588 A | 3/1937 | Meyers |
| 2,113,219 A | 4/1938 | Olson |
| 2,164,655 A | 7/1939 | Kleerup |
| 2,233,412 A | 3/1941 | Hill |
| 2,268,529 A | 12/1941 | Stiles |
| 2,343,037 A | 2/1944 | Adelman |
| 2,377,449 A | 6/1945 | Prevette |
| 2,481,250 A | 9/1949 | Schneider |
| 2,521,603 A | 9/1950 | Prew |
| 2,533,565 A | 12/1950 | Eichelman |
| 2,539,671 A | 1/1951 | Olson |
| 2,777,232 A | 1/1957 | Kulicke |
| 2,828,508 A | 4/1958 | Labarre |
| 2,840,181 A | 6/1958 | Wildman |
| 2,882,633 A | 4/1959 | Howell |
| 2,912,605 A | 11/1959 | Tibbetts |
| 2,938,113 A | 5/1960 | Schnell |
| 2,950,556 A | 8/1960 | Larios |
| 3,019,854 A | 2/1962 | Obryant |
| 3,132,713 A | 5/1964 | Seeler |
| 3,143,182 A | 8/1964 | Sears |
| 3,160,225 A | 12/1964 | Sechrist |
| 3,161,975 A | 12/1964 | McMillan |
| 3,205,601 A | 9/1965 | Gawne |
| 3,239,973 A | 3/1966 | Hannes |
| 3,240,883 A | 3/1966 | Seeler |
| 3,310,901 A | 3/1967 | Sarkisian |
| 3,321,170 A | 5/1967 | Vye |
| 3,509,290 A | 4/1970 | Mochida |
| 3,573,399 A | 4/1971 | Schroeder |
| 3,657,490 A | 4/1972 | Scheiber |
| 3,696,885 A | 10/1972 | Grieg |
| 3,755,625 A | 8/1973 | Maston |
| 3,828,508 A | 8/1974 | Moeller |
| 3,857,191 A | 12/1974 | Sadorus |
| 3,895,194 A | 7/1975 | Fraim |
| 3,906,431 A | 9/1975 | Clearwaters |
| 3,936,606 A | 2/1976 | Wanke |
| 3,938,617 A | 2/1976 | Forbes |
| 3,941,638 A | 3/1976 | Horky |
| 3,992,584 A | 11/1976 | Dugan |
| 4,007,461 A | 2/1977 | Luedtke |
| 4,008,408 A | 2/1977 | Kodama |
| 4,029,170 A | 6/1977 | Phillips |
| 4,032,725 A | 6/1977 | McGee |
| 4,070,547 A | 1/1978 | Dellar |
| 4,072,821 A | 2/1978 | Bauer |
| 4,096,353 A | 6/1978 | Bauer |
| 4,127,156 A | 11/1978 | Brandt |
| 4,131,760 A | 12/1978 | Christensen |
| 4,169,219 A | 9/1979 | Beard |
| 4,184,048 A | 1/1980 | Alcaide |
| 4,198,705 A | 4/1980 | Massa |
| 4,212,133 A | 7/1980 | Lufkin |
| 4,237,339 A | 12/1980 | Bunting |
| 4,244,096 A | 1/1981 | Kashichi |
| 4,244,906 A | 1/1981 | Heinemann |
| 4,254,417 A | 3/1981 | Speiser |
| 4,275,694 A | 6/1981 | Nagaishi |
| 4,296,280 A | 10/1981 | Richie |
| 4,305,141 A | 12/1981 | Massa |
| 4,308,425 A | 12/1981 | Momose |
| 4,311,874 A | 1/1982 | Wallace, Jr. |
| 4,330,691 A | 5/1982 | Gordon |
| 4,334,740 A | 6/1982 | Wray |
| 4,365,449 A | 12/1982 | Liautaud |
| 4,373,191 A | 2/1983 | Fette |
| 4,393,631 A | 7/1983 | Krent |
| 4,414,433 A | 11/1983 | Horie |
| 4,429,850 A | 2/1984 | Weber |
| 4,436,966 A | 3/1984 | Botros |
| 4,449,238 A | 5/1984 | Lee |
| 4,466,117 A | 8/1984 | Goerike |
| 4,485,484 A | 11/1984 | Flanagan |
| 4,489,442 A | 12/1984 | Anderson |
| 4,518,826 A | 5/1985 | Caudill |
| 4,521,908 A | 6/1985 | Miyaji |
| 4,566,557 A | 1/1986 | Lemaitre |
| 4,593,404 A | 6/1986 | Bolin |
| 4,594,478 A | 6/1986 | Gumb |
| 4,625,827 A | 12/1986 | Bartlett |
| 4,653,102 A | 3/1987 | Hansen |
| 4,658,425 A | 4/1987 | Julstrom |
| 4,669,108 A | 5/1987 | Deinzer |
| 4,675,906 A | 6/1987 | Sessler |
| 4,693,174 A | 9/1987 | Anderson |
| 4,696,043 A | 9/1987 | Iwahara |
| 4,712,231 A | 12/1987 | Julstrom |
| 4,741,038 A | 4/1988 | Elko |
| 4,752,961 A | 6/1988 | Kahn |
| 4,768,086 A | 8/1988 | Paist |
| 4,805,730 A | 2/1989 | O'Neill |
| 4,815,132 A | 3/1989 | Minami |
| 4,860,366 A | 8/1989 | Fukushi |
| 4,862,507 A | 8/1989 | Woodard |
| 4,866,868 A | 9/1989 | Kass |
| 4,881,135 A | 11/1989 | Heilweil |
| 4,888,807 A | 12/1989 | Reichel |
| 4,903,247 A | 2/1990 | Van Gerwen |
| 4,923,032 A | 5/1990 | Nuernberger |
| 4,928,312 A | 5/1990 | Hill |
| 4,969,197 A | 11/1990 | Takaya |
| 5,000,286 A | 3/1991 | Crawford |
| 5,038,935 A | 8/1991 | Wenkman |
| 5,058,170 A | 10/1991 | Kanamori |
| 5,088,574 A | 2/1992 | Kertesz, III |
| 5,121,426 A | 6/1992 | Baumhauer |
| 5,189,701 A | 2/1993 | Jain |
| 5,204,907 A | 4/1993 | Staple |
| 5,214,709 A | 5/1993 | Ribic |
| 5,289,544 A | 2/1994 | Franklin |
| 5,297,210 A | 3/1994 | Julstrom |
| 5,322,979 A | 6/1994 | Cassity |
| 5,323,459 A | 6/1994 | Hirano |
| 5,329,593 A | 7/1994 | Lazzeroni |
| 5,335,011 A | 8/1994 | Addeo |
| 5,353,279 A | 10/1994 | Koyama |
| 5,359,374 A | 10/1994 | Schwartz |
| 5,371,789 A | 12/1994 | Hirano |
| 5,383,293 A | 1/1995 | Royal |
| 5,384,843 A | 1/1995 | Masuda |
| 5,396,554 A | 3/1995 | Hirano |
| 5,400,413 A | 3/1995 | Kindel |
| 5,473,701 A | 12/1995 | Cezanne |
| 5,509,634 A | 4/1996 | Gebka |
| 5,513,265 A | 4/1996 | Hirano |
| 5,525,765 A | 6/1996 | Freiheit |
| 5,550,924 A | 8/1996 | Helf |
| 5,550,925 A | 8/1996 | Hori |
| 5,555,447 A | 9/1996 | Kotzin |
| 5,574,793 A | 11/1996 | Hirschhorn |
| 5,602,962 A | 2/1997 | Kellermann |
| 5,633,936 A | 5/1997 | Oh |
| 5,645,257 A | 7/1997 | Ward |
| 5,657,393 A | 8/1997 | Crow |
| 5,661,813 A | 8/1997 | Shimauchi |
| 5,673,327 A | 9/1997 | Julstrom |
| 5,687,229 A | 11/1997 | Sih |
| 5,706,344 A | 1/1998 | Finn |
| 5,715,319 A | 2/1998 | Chu |
| 5,717,171 A | 2/1998 | Miller |
| 5,761,318 A | 6/1998 | Shimauchi |

(56) References Cited

U.S. PATENT DOCUMENTS

| | | |
|---|---|---|
| 5,766,702 A | 6/1998 | Lin |
| 5,787,183 A | 7/1998 | Chu |
| 5,796,819 A | 8/1998 | Romesburg |
| 5,848,146 A | 12/1998 | Slattery |
| 5,870,482 A | 2/1999 | Loeppert |
| 5,878,147 A | 3/1999 | Killion |
| 5,888,412 A | 3/1999 | Sooriakumar |
| 5,888,439 A | 3/1999 | Miller |
| 5,978,211 A | 11/1999 | Hong |
| 5,991,277 A | 11/1999 | Maeng |
| 6,035,962 A | 3/2000 | Lin |
| 6,039,457 A | 3/2000 | O'Neal |
| 6,041,127 A | 3/2000 | Elko |
| 6,049,607 A | 4/2000 | Marash |
| 6,069,961 A | 5/2000 | Nakazawa |
| 6,125,179 A | 9/2000 | Wu |
| 6,128,395 A | 10/2000 | De Vries |
| 6,137,887 A | 10/2000 | Anderson |
| 6,144,746 A | 11/2000 | Azima |
| 6,151,399 A | 11/2000 | Killion |
| 6,160,886 A | 12/2000 | Romesburg |
| 6,173,059 B1 | 1/2001 | Huang |
| 6,185,300 B1 | 2/2001 | Romesburg |
| 6,198,831 B1 | 3/2001 | Azima |
| 6,205,224 B1 | 3/2001 | Underbrink |
| 6,215,881 B1 | 4/2001 | Azima |
| 6,266,427 B1 | 7/2001 | Mathur |
| 6,285,770 B1 | 9/2001 | Azima |
| 6,301,357 B1 | 10/2001 | Romesburg |
| 6,329,908 B1 | 12/2001 | Frecska |
| 6,332,029 B1 | 12/2001 | Azima |
| 6,386,315 B1 | 5/2002 | Roy |
| 6,393,129 B1 | 5/2002 | Conrad |
| 6,424,635 B1 | 7/2002 | Song |
| 6,442,272 B1 | 8/2002 | Osovets |
| 6,449,593 B1 | 9/2002 | Valve |
| 6,481,173 B1 | 11/2002 | Roy |
| 6,488,367 B1 | 12/2002 | Debesis |
| 6,505,057 B1 | 1/2003 | Finn |
| 6,507,659 B1 | 1/2003 | Iredale |
| 6,510,919 B1 | 1/2003 | Roy |
| 6,526,147 B1 | 2/2003 | Rung |
| 6,556,682 B1 | 4/2003 | Gilloire |
| 6,592,237 B1 | 7/2003 | Pledger |
| 6,622,030 B1 | 9/2003 | Romesburg |
| 6,633,647 B1 | 10/2003 | Markow |
| 6,665,971 B2 | 12/2003 | Lowry |
| 6,694,028 B1 | 2/2004 | Matsuo |
| 6,704,422 B1 | 3/2004 | Jensen |
| 6,731,334 B1 | 5/2004 | Maeng |
| 6,741,720 B1 | 5/2004 | Myatt |
| 6,757,393 B1 | 6/2004 | Spitzer |
| 6,768,795 B2 | 7/2004 | Feltstroem |
| 6,868,377 B1 | 3/2005 | Laroche |
| 6,885,750 B2 | 4/2005 | Egelmeers |
| 6,885,986 B1 | 4/2005 | Gigi |
| 6,889,183 B1 | 5/2005 | Gunduzhan |
| 6,895,093 B1 | 5/2005 | Ali |
| 6,931,123 B1 | 8/2005 | Hughes |
| 6,944,312 B2 | 9/2005 | Mason |
| 6,968,064 B1 | 11/2005 | Ning |
| 6,990,193 B2 | 1/2006 | Beaucoup |
| 6,993,126 B1 | 1/2006 | Kyrylenko |
| 6,993,145 B2 | 1/2006 | Combest |
| 7,003,099 B1 | 2/2006 | Zhang |
| 7,013,267 B1 | 3/2006 | Huart |
| 7,031,269 B2 | 4/2006 | Lee |
| 7,035,398 B2 | 4/2006 | Matsuo |
| 7,035,415 B2 | 4/2006 | Belt |
| 7,050,576 B2 | 5/2006 | Zhang |
| 7,054,451 B2 | 5/2006 | Janse |
| 7,092,516 B2 | 8/2006 | Furuta |
| 7,092,882 B2 | 8/2006 | Arrowood |
| 7,098,865 B2 | 8/2006 | Christensen |
| 7,106,876 B2 | 9/2006 | Santiago |
| 7,120,269 B2 | 10/2006 | Lowell |
| 7,130,309 B2 | 10/2006 | Planka |
| 7,149,320 B2 | 12/2006 | Haykin |
| 7,161,534 B2 | 1/2007 | Tsai |
| 7,187,765 B2 | 3/2007 | Popovic |
| 7,203,308 B2 | 4/2007 | Kubota |
| 7,212,628 B2 | 5/2007 | Popovic |
| 7,239,714 B2 | 7/2007 | de Blok |
| 7,269,263 B2 | 9/2007 | Dedieu |
| 7,333,476 B2 | 2/2008 | LeBlanc |
| 7,359,504 B1 | 4/2008 | Reuss |
| 7,366,310 B2 | 4/2008 | Stinson |
| 7,387,151 B1 | 6/2008 | Payne |
| 7,412,376 B2 | 8/2008 | Florencio |
| 7,415,117 B2 | 8/2008 | Tashev |
| 7,503,616 B2 | 3/2009 | Linhard |
| 7,515,719 B2 | 4/2009 | Hooley |
| 7,536,769 B2 | 5/2009 | Pedersen |
| 7,558,381 B1 | 7/2009 | Ali |
| 7,561,700 B1 | 7/2009 | Bernardi |
| 7,565,949 B2 | 7/2009 | Tojo |
| 7,651,390 B1 | 1/2010 | Profeta |
| 7,660,428 B2 | 2/2010 | Rodman |
| 7,667,728 B2 | 2/2010 | Kenoyer |
| 7,672,445 B1 | 3/2010 | Zhang |
| 7,701,110 B2 | 4/2010 | Fukuda |
| 7,702,116 B2 | 4/2010 | Stone |
| 7,724,891 B2 | 5/2010 | Beaucoup |
| 7,747,001 B2 | 6/2010 | Kellermann |
| 7,756,278 B2 | 7/2010 | Moorer |
| 7,783,063 B2 | 8/2010 | Pocino |
| 7,787,328 B2 | 8/2010 | Chu |
| 7,830,862 B2 | 11/2010 | James |
| 7,831,035 B2 | 11/2010 | Stokes |
| 7,831,036 B2 | 11/2010 | Beaucoup |
| 7,856,097 B2 | 12/2010 | Tokuda |
| 7,881,486 B1 | 2/2011 | Killion |
| 7,894,421 B2 | 2/2011 | Kwan |
| 7,925,006 B2 | 4/2011 | Hirai |
| 7,925,007 B2 | 4/2011 | Stokes |
| 7,936,886 B2 | 5/2011 | Kim |
| 7,970,123 B2 | 6/2011 | Beaucoup |
| 7,970,151 B2 | 6/2011 | Oxford |
| 7,991,167 B2 | 8/2011 | Oxford |
| 7,995,768 B2 | 8/2011 | Miki |
| 8,000,481 B2 | 8/2011 | Nishikawa |
| 8,005,238 B2 | 8/2011 | Tashev |
| 8,019,091 B2 | 9/2011 | Burnett |
| 8,041,054 B2 | 10/2011 | Yeldener |
| 8,059,843 B2 | 11/2011 | Hung |
| 8,064,629 B2 | 11/2011 | Jiang |
| 8,085,947 B2 | 12/2011 | Haulick |
| 8,085,949 B2 | 12/2011 | Kim |
| 8,095,120 B1 | 1/2012 | Blair |
| 8,098,842 B2 | 1/2012 | Florencio |
| 8,098,844 B2 | 1/2012 | Elko |
| 8,103,030 B2 | 1/2012 | Barthel |
| 8,109,360 B2 | 2/2012 | Stewart, Jr. |
| 8,112,272 B2 | 2/2012 | Nagahama |
| 8,116,500 B2 | 2/2012 | Oxford |
| 8,121,834 B2 | 2/2012 | Rosec |
| 8,130,969 B2 | 3/2012 | Buck |
| 8,130,977 B2 | 3/2012 | Chu |
| 8,135,143 B2 | 3/2012 | Ishibashi |
| 8,144,886 B2 | 3/2012 | Ishibashi |
| 8,155,331 B2 | 4/2012 | Nakadai |
| 8,170,882 B2 | 5/2012 | Davis |
| 8,175,291 B2 | 5/2012 | Chan |
| 8,175,871 B2 | 5/2012 | Wang |
| 8,184,801 B1 | 5/2012 | Hamalainen |
| 8,189,765 B2 | 5/2012 | Nishikawa |
| 8,189,810 B2 | 5/2012 | Wolff |
| 8,194,863 B2 | 6/2012 | Takumai |
| 8,199,927 B1 | 6/2012 | Raftery |
| 8,204,198 B2 | 6/2012 | Adeney |
| 8,204,248 B2 | 6/2012 | Haulick |
| 8,208,664 B2 | 6/2012 | Iwasaki |
| 8,213,596 B2 | 7/2012 | Beaucoup |
| 8,213,634 B1 | 7/2012 | Daniel |

(56) References Cited

U.S. PATENT DOCUMENTS

| | | |
|---|---|---|
| 8,219,387 B2 | 7/2012 | Cutler |
| 8,229,134 B2 | 7/2012 | Duraiswami |
| 8,233,352 B2 | 7/2012 | Beaucoup |
| 2005/0058277 A1 | 3/2005 | Barron |
| 2015/0181018 A1 | 6/2015 | Mani |
| 2016/0142814 A1 | 5/2016 | Deroo |
| 2016/0142815 A1 | 5/2016 | Norris |
| 2016/0148057 A1 | 5/2016 | Oh |
| 2016/0150315 A1 | 5/2016 | Tzirkel-Hancock |
| 2016/0150316 A1 | 5/2016 | Kubota |
| 2016/0155455 A1 | 6/2016 | Ojanperä |
| 2016/0165340 A1 | 6/2016 | Benattar |
| 2016/0173976 A1 | 6/2016 | Podhradsky |
| 2016/0173978 A1 | 6/2016 | Li |
| 2016/0189727 A1 | 6/2016 | Wu |
| 2016/0192068 A1 | 6/2016 | Ng |
| 2016/0196836 A1 | 7/2016 | Yu |
| 2016/0234593 A1 | 8/2016 | Matsumoto |
| 2016/0249132 A1 | 8/2016 | Oliaei |
| 2016/0275961 A1 | 9/2016 | Yu |
| 2016/0295279 A1 | 10/2016 | Srinivasan |
| 2016/0300584 A1 | 10/2016 | Pandey |
| 2016/0302002 A1 | 10/2016 | Lambert |
| 2016/0302006 A1 | 10/2016 | Pandey |
| 2016/0323667 A1 | 11/2016 | Shumard |
| 2016/0323668 A1 | 11/2016 | Abraham |
| 2016/0330545 A1 | 11/2016 | Mcelveen |
| 2016/0337523 A1 | 11/2016 | Pandey |
| 2016/0353200 A1 | 12/2016 | Bigeh |
| 2016/0357508 A1 | 12/2016 | Moore |
| 2017/0019744 A1 | 1/2017 | Matsumoto |
| 2017/0064451 A1 | 3/2017 | Park |
| 2017/0105066 A1 | 4/2017 | Mclaughlin |
| 2017/0134849 A1 | 5/2017 | Pandey |
| 2017/0134850 A1 | 5/2017 | Graham |
| 2017/0164101 A1 | 6/2017 | Rollow, IV |
| 2017/0180861 A1 | 6/2017 | Chen |
| 2017/0206064 A1 | 7/2017 | Breazeal |
| 2017/0230748 A1 | 8/2017 | Shumard |
| 2017/0264999 A1 | 9/2017 | Fukuda |
| 2017/0303887 A1 | 10/2017 | Richmond |
| 2017/0308352 A1 | 10/2017 | Kessler |
| 2017/0374454 A1 | 12/2017 | Bernardini |
| 2018/0083848 A1 | 3/2018 | Siddiqi |
| 2018/0102136 A1 | 4/2018 | Ebenezer |
| 2018/0109873 A1 | 4/2018 | Xiang |
| 2018/0115799 A1 | 4/2018 | Thiele |
| 2018/0160224 A1 | 6/2018 | Graham |
| 2018/0196585 A1 | 7/2018 | Densham |
| 2018/0205830 A1 | 7/2018 | Wells-Rutherford |
| 2018/0219922 A1 | 8/2018 | Bryans |
| 2018/0227666 A1 | 8/2018 | Barnett |
| 2018/0292079 A1 | 10/2018 | Branham |
| 2018/0310096 A1 | 10/2018 | Shumard |
| 2018/0313558 A1 | 11/2018 | Byers |
| 2018/0338205 A1 | 11/2018 | Abraham |
| 2018/0359565 A1 | 12/2018 | Kim |
| 2019/0042187 A1 | 2/2019 | Truong |
| 2019/0166424 A1 | 5/2019 | Harney |
| 2019/0215540 A1 | 7/2019 | Nicol |
| 2019/0230436 A1 | 7/2019 | Tsingos |
| 2019/0259408 A1 | 8/2019 | Freeman |
| 2019/0268683 A1 | 8/2019 | Miyahara |
| 2019/0295540 A1 | 9/2019 | Grima |
| 2019/0295569 A1 | 9/2019 | Wang |
| 2019/0319677 A1 | 10/2019 | Hansen |
| 2019/0371354 A1 | 12/2019 | Lester |
| 2019/0373362 A1 | 12/2019 | Ansai |
| 2019/0385629 A1 | 12/2019 | Moravy |
| 2019/0387311 A1 | 12/2019 | Schultz |
| 2020/0015021 A1 | 1/2020 | Leppanen |
| 2020/0021910 A1 | 1/2020 | Rollow, IV |
| 2020/0027472 A1 | 1/2020 | Huang |
| 2020/0037068 A1 | 1/2020 | Barnett |
| 2020/0068297 A1 | 2/2020 | Rollow, IV |
| 2020/0100009 A1 | 3/2020 | Lantz |
| 2020/0100025 A1 | 3/2020 | Shumard |
| 2020/0137485 A1 | 4/2020 | Yamakawa |
| 2020/0145753 A1 | 5/2020 | Rollow, IV |
| 2020/0152218 A1 | 5/2020 | Kikuhara |
| 2020/0162618 A1 | 5/2020 | Enteshari |
| 2020/0228663 A1 | 7/2020 | Wells-Rutherford |
| 2020/0251119 A1 | 8/2020 | Yang |
| 2020/0275204 A1 | 8/2020 | Labosco |
| 2020/0278043 A1 | 9/2020 | Cao |
| 2020/0288237 A1 | 9/2020 | Abraham |
| 2021/0012789 A1 | 1/2021 | Husain |
| 2021/0021940 A1 | 1/2021 | Petersen |
| 2021/0044881 A1 | 2/2021 | Lantz |
| 2021/0051397 A1 | 2/2021 | Veselinovic |
| 2021/0098014 A1 | 4/2021 | Tanaka |
| 2021/0098015 A1 | 4/2021 | Pandey |
| 2021/0120335 A1 | 4/2021 | Veselinovic |
| 2021/0200504 A1 | 7/2021 | Park |
| 2021/0375298 A1 | 12/2021 | Zhang |

FOREIGN PATENT DOCUMENTS

| | | | |
|---|---|---|---|
| CA | 2475283 | | 1/2005 |
| CA | 2505496 | | 10/2006 |
| CA | 2838856 | | 12/2012 |
| CA | 2846323 | | 9/2014 |
| CN | 1780495 | | 5/2006 |
| CN | 101217830 | | 7/2008 |
| CN | 101833954 | | 9/2010 |
| CN | 101860776 | | 10/2010 |
| CN | 101894558 | | 11/2010 |
| CN | 102646418 | | 8/2012 |
| CN | 102821336 | | 12/2012 |
| CN | 102833664 | | 12/2012 |
| CN | 102860039 | | 1/2013 |
| CN | 104036784 | | 9/2014 |
| CN | 104053088 | | 9/2014 |
| CN | 104080289 | A1 | 10/2014 |
| CN | 104347076 | | 2/2015 |
| CN | 104581463 | | 4/2015 |
| CN | 105355210 | | 2/2016 |
| CN | 105548998 | | 5/2016 |
| CN | 106162427 | | 11/2016 |
| CN | 106233751 | | 12/2016 |
| CN | 106251857 | | 12/2016 |
| CN | 106851036 | | 6/2017 |
| CN | 107221336 | | 9/2017 |
| CN | 107534725 | | 1/2018 |
| CN | 108172235 | | 6/2018 |
| CN | 109087664 | | 12/2018 |
| CN | 208190895 | | 12/2018 |
| CN | 109727604 | | 5/2019 |
| CN | 110010147 | | 7/2019 |
| CN | 306391029 | | 3/2021 |
| DE | 2941485 | | 4/1981 |
| EP | 0381498 | | 8/1990 |
| EP | 0594098 | | 4/1994 |
| EP | 0869697 | | 10/1998 |
| EP | 1180914 | | 2/2002 |
| EP | 1184676 | | 3/2002 |
| EP | 0944228 | | 6/2003 |
| EP | 1439526 | | 7/2004 |
| EP | 1651001 | | 4/2006 |
| EP | 1727344 | | 11/2006 |
| EP | 1906707 | | 4/2008 |
| EP | 1952393 | | 8/2008 |
| EP | 1962547 | | 8/2008 |
| EP | 2133867 | | 12/2009 |
| EP | 2159789 | | 3/2010 |
| WO | 2018140618 | | 8/2018 |
| WO | 2018211806 | | 11/2018 |
| WO | 2019231630 | | 12/2019 |

(56) References Cited

FOREIGN PATENT DOCUMENTS

| WO | 2020168873 | 8/2020 |
|---|---|---|
| WO | 2020191354 | 9/2020 |

OTHER PUBLICATIONS

Tan, et al., "Pitch Detection Algorithm: Autocorrelation Method and AMDF," Department of Computer Engineering, Prince of Songkhla University, Jan. 2003, 6 pp.
Tandon, et al., "An Efficient, Low-Complexity, Normalized LMS Algorithm for Echo Cancellation," 2nd Annual IEEE Northeast Workshop on Circuits and Systems, Jun. 2004, pp. 161-164.
Tetelbaum et al., Design and Implementation of a Conference Phone Based on Microphone Array Technology, Proc. Global Signal Processing Conference and Expo (GSPx), Sep. 2004, 6 pgs.
Tiete et al., SoundCompass: A Distributed MEMS Microphone Array-Based Sensor for Sound Source Localization, Sensors, Jan. 23, 2014, pp. 1918-1949.
TOA Corp., Ceiling Mount Microphone AN-9001 Operating Instructions, http://www.toaelectronics.com/media/an9001_mt1e.pdf, 1 pg.
Togami, et al., "Subband Beamformer Combined with Time-Frequency ICA for Extraction of Target Source Under Reverberant Environments," 17th European Signal Processing Conference, Aug. 2009, 5 pp.
U.S. Appl. No. 16/598,918, filed Oct. 10, 2019, 50 pp.
Van Compernolle, Switching Adaptive Filters for Enhancing Noisy and Reverberant Speech from Microphone Array Recordings, Proc. IEEE Int. Conf. on Acoustics, Speech, and Signal Processing, Apr. 1990, pp. 833-836.
Van Trees, Optimum Array Processing: Part IV of Detection, Estimation, and Modulation Theory, 2002, 54 pgs., pp. i-xxv, 90-95, 201-230.
Van Veen et al., Beamforming: A Versatile Approach to Spatial Filtering, IEEE ASSP Magazine, vol. 5, issue 2, Apr. 1988, pp. 4-24.
Vicente, "Adaptive Array Signal Processing Using the Concentric Ring Array and the Spherical Array," Ph.D. Dissertation, University of Missouri, May 2009, 226 pp.
Wang et al., Combining Superdirective Beamforming and Frequency-Domain Blind Source Separation for Highly Reverberant Signals, EURASIP Journal on Audio, Speech, and Music Processing, vol. 2010, pp. 1-13.
Warsitz, et al., "Blind Acoustic Beamforming Based on Generalized Eigenvalue Decomposition," IEEE Transactions on Audio, Speech and Language Processing, vol. 15, No. 5, 2007, 11 pp.
Weinstein, et al., "LOUD: A 1020-Node Microphone Array and Acoustic Beamformer," 14th International Congress on Sound & Vibration, Jul. 2007, 8 pgs.
Weinstein, et al., "LOUD: A 1020-Node Modular Microphone Array and Beamformer for Intelligent Computing Spaces," MIT Computer Science and Artifical Intelligence Laboratory, 2004, 18 pp.
Wung, "A System Approach to Multi-Channel Acoustic Echo Cancellation and Residual Echo Suppression for Robust Hands-Free Teleconferencing," Georgia Institute of Technology, May 2015, 167 pp.
XAP Audio Conferencing Brochure, ClearOne Communications, Inc., 2002, 78 pp.
Yamaha Corp., MRX7-D Signal Processor Product Specifications, 2016, 12 pgs.
Yamaha Corp., PJP-100H IP Audio Conference System Owner's Manual, Sep. 2006, 59 pgs.
Yamaha Corp., PJP-EC200 Conference Echo Canceller Brochure, Oct. 2009, 2 pgs.
Yan et al., Convex Optimization Based Time-Domain Broadband Beamforming with Sidelobe Control, Journal of the Acoustical Society of America, vol. 121, No. 1, Jan. 2007, pp. 46-49.
Yensen et al., Synthetic Stereo Acoustic Echo Cancellation Structure with Microphone Array Beamforming for VOIP Conferences, 2000 IEEE International Conference on Acoustics, Speech, and Signal Processing, Jun. 2000, pp. 817-820.

Yermeche, et al., "Real-Time DSP Implementation of a Subband Beamforming Algorithm for Dual Microphone Speech Enhancement," 2007 IEEE International Symposium on Circuits and Systems, 4 pp.
Zavarehei, et al., "Interpolation of Lost Speech Segments Using LP-HNM Model with Codebook Post-Processing," IEEE Transactions on Multimedia, vol. 10, No. 3, Apr. 2008, 10 pp.
Zhang, et al., "F-T-LSTM based Complex Network for Joint Acoustic Echo Cancellation and Speech Enhancement," Audio, Speech and Language Processing Group, Jun. 2021, 5 pp.
Zhang, et al., "Multichannel Acoustic Echo Cancelation in Multiparty Spatial Audio Conferencing with Constrained Kalman Filtering," 11th International Workshop on Acoustic Echo and Noise Control, Sep. 14, 2008, 4 pp.
Zhang, et al., "Selective Frequency Invariant Uniform Circular Broadband Beamformer," EURASIP Journal on Advances in Signal Processing, vol. 2010, pp. 1-11.
Zheng, et al., "Experimental Evaluation of a Nested Microphone Array With Adaptive Noise Cancellers," IEEE Transactions on Instrumentation and Measurement, vol. 53, No. 3, Jun. 2004, 10 pp.
Johansson, et al., Speaker Localisation using the Far-Field SRP-PHAT in Conference Telephony, 2002 International Symposium on Intelligent Signal Processing and Communication Systems, 5 pgs.
Johnson, et al., "Array Signal Processing: Concepts and Techniques," p. 59, Prentice Hall, 1993, 3 pp.
Julstrom et al., Direction-Sensitive Gating: A New Approach to Automatic Mixing, J. Audio Eng. Soc., vol. 32, No. 7/8, Jul./Aug. 1984, pp. 490-506.
Kallinger et al., Multi-Microphone Residual Echo Estimation, 2003 IEEE International Conference on Acoustics, Speech, and Signal Processing, Apr. 2003, 4 pgs.
Kammeyer, et al., New Aspects of Combining Echo Cancellers with Beamformers, IEEE International Conference on Acoustics, Speech, and Signal Processing, Mar. 2005, pp. III-137-III-140.
Kellermann, A Self-Steering Digital Microphone Array, 1991 International Conference on Acoustics, Speech, and Signal Processing, Apr. 1991, pp. 3581-3584.
Kellermann, Acoustic Echo Cancellation for Beamforming Microphone Arrays, in Brandstein, ed., Microphone Arrays: Techniques and Applications, 2001, Springer-Verlag Berlin Heidelberg, pp. 281-306.
Kellermann, Integrating Acoustic Echo Cancellation with Adaptive Beamforming Microphone Arrays, Forum Acusticum, Berlin, Mar. 1999, pp. 1-4.
Kellermann, Strategies for Combining Acoustic Echo Cancellation and Adaptive Beamforming Microphone Arrays, 1997 IEEE International Conference on Acoustics, Speech, and Signal Processing, Apr. 1997, 4 pgs.
Klegon, "Achieve Invisible Audio with the MXA910 Ceiling Array Microphone," Jun. 27, 2016, 10 pp.
Knapp, et al., The Generalized Correlation Method for Estimation of Time Delay, IEEE Transactions on Acoustics, Speech, and Signal Processing, vol. ASSP-24, No. 4, Aug. 1976, pp. 320-327.
Kobayashi et al., A Hands-Free Unit with Noise Reduction by Using Adaptive Beamformer, IEEE Transactions on Consumer Electronics, vol. 54, No. 1, Feb. 2008, pp. 116-122.
Kobayashi et al., A Microphone Array System with Echo Canceller, Electronics and Communications in Japan, Part 3, vol. 89, No. 10, Feb. 2, 2006, pp. 23-32.
Kolundžija, et al., "Baffled circular loudspeaker array with broadband high directivity," 2010 IEEE International Conference on Acoustics, Speech and Signal Processing, Dallas, TX, 2010, pp. 73-76.
Lai, et al., "Design of Robust Steerable Broadband Beamformers with Spiral Arrays and the Farrow Filter Structure," Proc. Intl. Workshop Acoustic Echo Noise Control, 2010, 4 pp.
Lebret, et al., Antenna Array Pattern Synthesis via Convex Optimization, IEEE Trans. on Signal Processing, vol. 45, No. 3, Mar. 1997, pp. 526-532.
LecNet2 Sound System Design Guide, Lectrosonics, Jun. 2, 2006. 28 pages.
Lectrosonics, LecNet2 Sound System Design Guide, Jun. 2006, 28 pgs.

(56) References Cited

OTHER PUBLICATIONS

Lee et al., Multichannel Teleconferencing System with Multispatial Region Acoustic Echo Cancellation, International Workshop on Acoustic Echo and Noise Control (IWAENC2003), Sep. 2003, pp. 51-54.
Li, "Broadband Beamforming and Direction Finding Using Concentric Ring Array," Ph.D. Dissertation, University of Missouri-Columbia, Jul. 2005, 163 pp.
Lindstrom et al., An Improvement of the Two-Path Algorithm Transfer Logic for Acoustic Echo Cancellation, IEEE Transactions on Audio, Speech, and Language Processing, vol. 15, No. 4, May 2007, pp. 1320-1326.
Liu et al., Adaptive Beamforming with Sidelobe Control: A Second-Order Cone Programming Approach, IEEE Signal Proc. Letters, vol. 10, No. 11, Nov. 2003, pp. 331-334.
Liu, et al., "Frequency Invariant Beamforming in Subbands," IEEE Conference on Signals, Systems and Computers, 2004, 5 pp.
Liu, et al., "Wideband Beamforming," Wiley Series on Wireless Communications and Mobile Computing, pp. 143-198, 2010, 297 pp.
Lobo, et al., Applications of Second-Order Cone Programming, Linear Algebra and its Applications 284, 1998, pp. 193-228.
Luo et al., Wideband Beamforming with Broad Nulls of Nested Array, Third Int'l Conf. on Info. Science and Tech., Mar. 23-25, 2013, pp. 1645-1648.
Marquardt et al., A Natural Acoustic Front-End for Interactive TV in the EU-Project DICIT, IEEE Pacific Rim Conference on Communications, Computers and Signal Processing, Aug. 2009, pp. 894-899.
Martin, Small Microphone Arrays with Postfilters for Noise and Acoustic Echo Reduction, in Brandstein, ed., Microphone Arrays: Techniques and Applications, 2001, Springer-Verlag Berlin Heidelberg, pp. 255-279.
Maruo et al., On the Optimal Solutions of Beamformer Assisted Acoustic Echo Cancellers, IEEE Statistical Signal Processing Workshop, 2011, pp. 641-644.
McCowan, Microphone Arrays: A Tutorial, Apr. 2001, 36 pgs.
MFLCRFG Datasheet, Metal_Fab Inc., Sep. 7, 2007, 1 p.
Microphone Array Primer, Shure Question and Answer Page, <https://service.shure.com/s/article/microphone-array-primer?language=en_US>, 5 pp, Nov. 2020.
Milanovic, et al., "Design and Realization of FPGA Platform for Real Time Acoustic Signal Acquisition and Data Processing" 22nd Telecommunications Forum TELFOR, 2014, 6 pp.
Mohammed, A New Adaptive Beamformer for Optimal Acoustic Echo and Noise Cancellation with Less Computational Load, Canadian Conference on Electrical and Computer Engineering, May 2008, pp. 000123-000128.
Mohammed, A New Robust Adaptive Beamformer for Enhancing Speech Corrupted with Colored Noise, AICCSA, Apr. 2008, pp. 508-515.
Mohammed, Real-time Implementation of an efficient RLS Algorithm based on IIR Filter for Acoustic Echo Cancellation, AICCSA, Apr. 2008, pp. 489-494.
Mohan, et al., "Localization of multiple acoustic sources with small arrays using a coherence test," Journal Acoustic Soc Am., 123(4), Apr. 2008, 12 pp.
Moulines, et al., "Pitch-Synchronous Waveform Processing Techniques for Text-to-Speech Synthesis Using Diphones," Speech Communication 9, 1990, 15 pp.
Multichannel Acoustic Echo Cancellation, Obtained from website http://www.buchner-net.com/mcaec.html, Jun. 2011, 3 pp.
Myllyla et al., Adaptive Beamforming Methods for Dynamically Steered Microphone Array Systems, 2008 IEEE International Conference on Acoustics, Speech and Signal Processing, Mar.-Apr. 2008, pp. 305-308.
New Shure Microflex Advance MXA910 Microphone With Intellimix Audio Processing Provides Greater Simplicity, Flexibility, Clarity, Press Release, Jun. 12, 2019, 4 pp.
Nguyen-Ky, et al., "An Improved Error Estimation Algorithm for Stereophonic Acoustic Echo Cancellation Systems," 1st International Conference on Signal Processing and Communication Systems, Dec. 17-19, 2007, 5 pp.
Office Action for Taiwan Patent Application No. 105109900 dated May 5, 2017, 10 pp.
Office Action issued for Japanese Patent Application No. 2015-023781 dated Jun. 20, 2016, 4 pp.
Oh, et al., "Hands-Free Voice Communication in an Automobile With a Microphone Array," 1992 IEEE International Conference on Acoustics, Speech, and Signal Processing, Mar. 1992, pp. I-281-I-284.
Olszewski, et al., "Steerable Highly Directional Audio Beam Loudspeaker," Interspeech 2005, 4 pp.
Omologo, Multi-Microphone Signal Processing for Distant-Speech Interaction, Human Activity and Vision Summer School (HAVSS), INRIA Sophia Antipolis, Oct. 3, 2012, 79 pgs.
Order, Conduct of the Proceeding, *Clearone, Inc.* v. *Shure Acquisition Holdings, Inc.*, Nov. 2, 2020, 10 pp.
"Philips Hue Bulbs and Wireless Connected Lighting System," Web page https://www.philips-hue.com/en-in, 8 pp, Sep. 23, 2020, retrieved from Internet Archive Wayback Machine, <https://web.archive.org/web/20200923171037/https://www.philips-hue.com/en-in> on Sep. 27, 2021. 8 pages.
"Vsa 2050 II Digitally Steerable Column Speaker," Web page https://www.rcf.it/en_US/products/product-detail/vsa-2050-ii/972389, 15 pages, Dec. 24, 2018.
Advanced Network Devices, IPSCM Ceiling Tile IP Speaker, Feb. 2011, 2 pgs.
Advanced Network Devices, IPSCM Standard 2' by 2' Ceiling Tile Speaker, 2 pgs.
Affes, et al., "A Signal Subspace Tracking Algorithm for Microphone Array Processing of Speech," IEEE Trans. on Speech and Audio Processing, vol. 5, No. 5, Sep. 1997, pp. 425-437.
Affes, et al., "A Source Subspace Tracking Array of Microphones for Double Talk Situations," 1996 IEEE International Conference on Acoustics, Speech, and Signal Processing Conference Proceedings, May 1996, pp. 909-912.
Affes, et al., "An Algorithm for Multisource Beamforming and Multitarget Tracking," IEEE Trans. on Signal Processing, vol. 44, No. 6, Jun. 1996, pp. 1512-1522.
Affes, et al., "Robust Adaptive Beamforming via LMS-Like Target Tracking," Proceedings of IEEE International Conference on Acoustics, Speech and Signal Processing, Apr. 1994, pp. IV-269-IV-272.
Ahonen, et al, "Directional Analysis of Sound Field with Linear Microphone Array and Applications in Sound Reproduction," Audio Engineering Society, Convention Paper 7329, May 2008, 11 pp.
Alarifi, et al., "Ultra Wideband Indoor Positioning Technologies: Analysis and Recent Advances," Sensors 2016, vol. 16, No. 707, 36 pp.
Amazon webpage for Metalfab MFLCRFG (last visited Apr. 22, 2020) available at <https://www.amazon.com/RETURN-FILTERGRILLE-Drop-Ceiling/dp/B0064Q9A7I/ref=sr 12?dchild=1&keywords=drop+ceiling+return+air+grille&qid=1585862723&s=hi&sr=1-2>, 11 pp.
Armstrong "Walls" Catalog available at <https://www.armstrongceilings.com/content/dam/armstrongceilings/commercial/north-america/catalogs/armstrong-ceilings-wallsspecifiers-reference.pdf>, 2019, 30 pp.
Armstrong Tectum Ceiling & Wall Panels Catalog available at <https://www.armstrongceilings.com/content/dam/armstrongceilings/commercial/north-america/brochures/tectum-brochure.pdf>, 2019, 16 pp.
Armstrong Woodworks Concealed Catalog available at <https://sweets.construction.com/swts_content_files/3824/442581.pdf>, 2014, 6 pp.
Armstrong Woodworks Walls Catalog available at <https://www.armstrongceilings.com/pdbupimagesclg/220600.pdf/download/datasheet-woodworks-walls.pdf>, 2019, 2 pp.
Armstrong World Industries, Inc., I-Ceilings Sound Systems Speaker Panels, 2002, 4 pgs.

(56) References Cited

OTHER PUBLICATIONS

Armstrong, Acoustical Design: Exposed Structure, available at <https://www.armstrongceilings.com/pdbupimagesclg/217142.pdf/download/acoustical-design-exposed-structurespaces-brochure.pdf>, 2018, 19 pp.
Armstrong, Ceiling Systems, Brochure page for Armstrong Softlook, 1995, 2 pp.
Armstrong, Excerpts from Armstrong 2011-2012 Ceiling Wall Systems Catalog, available at <https://web.archive.org/web/20121116034120/http://www.armstrong.com/commceilingsna/en_us/pdf/ceilings_catalog_screen-2011.pdf>, as early as 2012, 162 pp.
Armstrong, i-Ceilings, Brochure, 2009, 12 pp.
Arnold, et al., "A Directional Acoustic Array Using Silicon Micromachined Piezoresistive Microphones," Journal of the Acoustical Society of America, 113(1), Jan. 2003, 10 pp.
Atlas Sound, I128SYSM IP Compliant Loudspeaker System with Microphone Data Sheet, 2009, 2 pgs.
Atlas Sound, 1'×2' IP Speaker with Micophone for Suspended Ceiling Systems, https://www.atlasied.com/i128sysm, retrieved Oct. 25, 2017, 5 pgs.
Audio Technica, ES945 Omnidirectional Condenser Boundary Microphones, https://eu.audio-technica.com/resources/ES945%20Specifications.pdf, 2007, 1 pg.
Audix Microphones, Audix Introduces Innovative Ceiling Mics, http://audixusa.com/docs_12/latest_news/EFplFKAAkIOtSdolke.shtml, Jun. 2011, 6 pgs.
Audix Microphones, M70 Flush Mount Ceiling Mic, May 2016, 2 pgs.
Automixer Gated, Information Sheet, MIT, Nov. 2019, 9 pp.
Beh, et al., "Combining Acoustic Echo Cancellation and Adaptive Beamforming for Achieving Robust Speech Interface in Mobile Robot," 2008 IEEE/RSJ International Conference on Intelligent Robots and Systems, Sep. 2008, pp. 1693-1698.
Benesty, et al., "A New Class of Doubletalk Detectors Based on Cross-Correlation," IEEE Transactions on Speech and Audio Processing, vol. 8, No. 2, Mar. 2000, pp. 168-172.
Benesty, et al., "Adaptive Algorithms for Mimo Acoustic Echo Cancellation," AI2 Allen Institute for Artifical Intelligence, 2003, 30 pp.
Benesty, et al., "Frequency-Domain Adaptive Filtering Revisited, Generalization to the Multi-Channel Case, and Application to Acoustic Echo Cancellation," 2000 IEEE International Conference on Acoustics, Speech, and Signal Processing Proceedings, Jun. 2000, pp. 789-792.
Benesty, et. Al., "Microphone Array Signal Processing," Springer, 2010, 20 pp.
Berkun, et al., "Combined Beamformers for Robust Broadband Regularized Superdirective Beamforming," IEEE/ACM Transactions on Audio, Speech, and Language Processing, vol. 23, No. 5, May 2015, 10 pp.
Beyer Dynamic, Classis BM 32-33-34 DE-EN-FR 2016, 1 pg.
Beyer Dynamic, Classis-BM-33-PZ A1, 2013, 1 pg.
BNO055, Intelligent 9-axis absolute orientation sensor, Data sheet, Bosch, Nov. 2020, 118 pp.
Boyd, et al., Convex Optimization, Mar. 15, 1999, 216 pgs.
Brandstein, et al., "Microphone Arrays: Signal Processing Techniques and Applications," Digital Signal Processing, Springer-Verlag Berlin Heidelberg, 2001, 401 pgs.
Brooks, et al., "A Quantitative Assessment of Group Delay Methods for Identifying Glottal Closures in Voiced Speech," EEE Transaction on Audio, Speech, and Language Processing, vol. 14, No. 2, Mar. 2006, 11 pp.
Bruel & Kjaer, by J.J. Christensen and J. Hald, Technical Review: Beamforming, No. 1, 2004, 54 pgs.
BSS Audio, Soundweb London Application Guides, 2010, 120 pgs.
Buchner, et al., "An Acoustic Human-Machine Interface with Multi-Channel Sound Reproduction," IEEE Fourth Workshop on Multimedia Signal Processing, Oct. 2001, pp. 359-364.
Buchner, et al., "An Efficient Combination of Multi-Channel Acoustic Echo Cancellation with a Beamforming Microphone Array," International Workshop on Hands-Free Speech Communication (HSC2001), Apr. 2001, pp. 55-58.
Buchner, et al., "Full-Duplex Communication Systems Using Loudspeaker Arrays and Microphone Arrays," IEEE International Conference on Multimedia and Expo, Aug. 2002, pp. 509-512.
Buchner, et al., "Generalized Multichannel Frequency-Domain Adaptive Filtering: Efficient Realization and Application to Hands-Free Speech Communication," Signal Processing 85, 2005, pp. 549-570.
Buchner, et al., "Multichannel Frequency-Domain Adaptive Filtering with Application to Multichannel Acoustic Echo Cancellation," Adaptive Signal Processing, 2003, pp. 95-128.
Buck, "Aspects of First-Order Differential Microphone Arrays in the Presence of Sensor Imperfections," Transactions on Emerging Telecommunications Technologies, 13.2, 2002, 8 pp.
Buck, et al., "First Order Differential Microphone Arrays for Automotive Applications," 7th International Workshop on Acoustic Echo and Noise Control, Darmstadt University of Technology, Sep. 10-13, 2001, 4 pp.
Pados et al., An Iterative Algorithm for the Computation of the MVDR Filter, IEEE Trans. on Signal Processing, vol. 49, No. 2, Feb. 2001, pp. 290-300.
Palladino, "This App Lets You Control Your Smarthome Lights via Augmented Reality," Next Reality Mobile AR News, Jul. 2, 2018, 5 pp.
Parikh, et al., "Methods for Mitigating IP Network Packet Loss in Real Time Audio Streaming Applications," GatesAir, 2014, 6 pp.
Pasha, et al., "Clustered Multi-channel Dereverberation for Ad-hoc Microphone Arrays," Proceedings of APSIPA Annual Summit and Conference, Dec. 2015, pp. 274-278.
Petitioner's Motion for Sanctions, *Clearone, Inc.* v. *Shure Acquisition Holdings, Inc.*, Aug. 24, 2020, 20 pp.
Pettersen, "Broadcast Applications for Voice-Activated Microphones," db, Jul./Aug. 1985, 6 pgs.
Pfeifenberger, et al., "Nonlinear Residual Echo Suppression using a Recurrent Neural Network," Interspeech 2020, 5 pp.
Phoenix Audio Technologies, "Beamforming and Microphone Arrays—Common Myths", Apr. 2016, http://info.phnxaudio.com/blog/microphone-arrays-beamforming-myths-1, 19 pp.
Plascore, PCGA-XR1 3003 Aluminum Honeycomb Data Sheet, 2008, 2 pgs.
Polycom Inc., Vortex EF2211/EF2210 Reference Manual, 2003, 66 pgs.
Polycom, Inc., Polycom SoundStructure C16, C12, C8, and SR12 Design Guide, Nov. 2013, 743 pgs.
Polycom, Inc., Setting Up the Polycom HDX Ceiling Microphone Array Series, https://support.polycom.com/content/dam/polycom-support/products/Telepresence-and-Video/HDX%20Series/setup-maintenance/en/hdx_ceiling_microphone_array_setting_up.pdf, 2010, 16 pgs.
Polycom, Inc., Vortex EF2241 Reference Manual, 2002, 68 pgs.
Polycom, Inc., Vortex EF2280 Reference Manual, 2001, 60 pp.
Pomona, Model 3306, Datasheet, Jun. 9, 1999, 1 p.
Powers, et al., "Proving Adaptive Directional Technology Works: A Review of Studies," The Hearing Review, Apr. 6, 2004, 5 pp.
Prime, et al., "Beamforming Array Optimisation Averaged Sound Source Mapping on a Model Wind Turbine," ResearchGate, Nov. 2014, 10 pp.
Rabinkin et al., Estimation of Wavefront Arrival Delay Using the Cross-Power Spectrum Phase Technique, 132nd Meeting of the Acoustical Society of America, Dec. 1996, pp. 1-10.
Rane Corp., Halogen Acoustic Echo Cancellation Guide, AEC Guide Version 2, Nov. 2013, 16 pgs.
Rao, et al., "Fast LMS/Newton Algorithms for Stereophonic Acoustic Echo Cancelation," IEEE Transactions on Signal Processing, vol. 57, No. 8, Aug. 2009. 12 pages.
Reuven et al., Joint Acoustic Echo Cancellation and Transfer Function GSC in the Frequency Domain, 23rd IEEE Convention of Electrical and Electronics Engineers in Israel, Sep. 2004, pp. 412-415.
Reuven et al., Joint Noise Reduction and Acoustic Echo Cancellation Using the Transfer-Function Generalized Sidelobe Canceller, Speech Communication, vol. 49, 2007, pp. 623-635.

(56) References Cited

OTHER PUBLICATIONS

Reuven, et al., "Multichannel Acoustic Echo Cancellation and Noise Reduction in Reverberant Environments Using the Transfer-Function GSC," 2007 IEEE International Conference on Acoustics, Speech and Signal Processing, Apr. 2007, 4 pp.

Ristimaki, Distributed Microphone Array System for Two-Way Audio Communication, Helsinki Univ. of Technology, Master's Thesis, Jun. 15, 2009, 73 pgs.

Rombouts et al., An Integrated Approach to Acoustic Noise and Echo Cancellation, Signal Processing 85, 2005, pp. 849-871.

Sällberg, "Faster Subband Signal Processing," IEEE Signal Processing Magazine, vol. 30, No. 5, Sep. 2013, 6 pp.

Sasaki et al., A Predefined Command Recognition System Using a Ceiling Microphone Array in Noisy Housing Environments, 2008 IEEE/RSJ International Conference on Intelligent Robots and Systems, Sep. 2008, pp. 2178-2184.

Sennheiser, TeamConnect Ceiling, https://en-us.sennheiser.com/conference-meeting-rooms-teamconnect-ceiling, 2017, 7 pgs.

SerDes, Wikipedia article, last edited on Jun. 25, 2018; retrieved on Jun. 27, 2018, 3 pp., https://en.wikipedia.org/wiki/SerDes.

Sessler, et al., "Directional Transducers," IEEE Transactions on Audio and Electroacoustics, vol. AU-19, No. 1, Mar. 1971, pp. 19-23.

Sessler, et al., "Toroidal Microphones," Journal of Acoustical Society of America, vol. 46, No. 1, 1969, 10 pp.

Shure AMS Update, vol. 1, No. 1, 1983, 2 pgs.

Shure AMS Update, vol. 4, No. 4, 1997, 8 pgs.

Shure Debuts Microflex Advance Ceiling and Table Array Microphones, Press Release, Feb. 9, 2016, 4 pp.

Shure Inc., A910-HCM Hard Ceiling Mount, retrieved from website <http://www.shure.com/en-US/products/accessories/a910hcm> on Jan. 16, 2020, 3 pp.

Shure Inc., Microflex Advance, http://www.shure.com/americas/microflex-advance, 12 pgs.

Shure Inc., MX395 Low Profile Boundary Microphones, 2007, 2 pgs.

Shure Inc., MXA910 Ceiling Array Microphone, http://www.shure.com/americas/products/microphones/microflex-advance/mxa910-ceiling-array-microphone, 7 pgs. 2009-2017.

Shure, New MXA910 Variant Now Available, Press Release, Dec. 13, 2019, 5 pp.

Shure, Q&A in Response to Recent Us Court Ruling on Shure MXA910, Available at <https://www.shure.com/en-US/meta/legal/q-and-a-inresponse-to-recent-us-court-ruling-on-shure-mxa910-response>, As early as 2020, 5 pp.

Shure, RK244G Replacement Screen and Grille, Datasheet, 2013, 1 p.

Shure, The Microflex Advance MXA310 Table Array Microphone, Available at <https://www.shure.com/en-US/products/microphones/mxa310>, As early as 2020, 12 pp.

Silverman et al., Performance of Real-Time Source-Location Estimators for a Large-Aperture Microphone Array, IEEE Transactions on Speech and Audio Processing, vol. 13, No. 4, Jul. 2005, pp. 593-606.

SM 69 Stereo Microphone, Datasheet, Georg Neumann GmbH, Available at <https://ende.neumann.com/product_files/6552/download>, 1 p.

Soda et al., Introducing Multiple Microphone Arrays for Enhancing Smart Home Voice Control, The Institute of Electronics, Information and Communication Engineers, Technical Report of IEICE, Jan. 2013, 6 pgs.

Soundweb London Application Guides, BSS Audio, 2010.

SYSTEM AND METHOD FOR AUTOMATIC ADJUSTMENT OF REFERENCE GAIN

CROSS-REFERENCE

This application is a continuation of U.S. patent application Ser. No. 17/169,262, filed on Feb. 5, 2021, which claims the benefit of U.S. Provisional Patent Application No. 62/971,850, filed on Feb. 7, 2020. The contents of both applications are incorporated by reference herein in their entirety.

TECHNICAL FIELD

This disclosure generally relates to gain adjustment of a reference signal provided to a mixer for mixing audio signals from a plurality of acoustic sources, such as microphones used in a conferencing system. In particular, the disclosure relates to systems and methods for automatically adjusting the reference gain.

BACKGROUND

Conferencing environments, such as boardrooms, conferencing settings, and the like, can involve the use of microphones for capturing sound from audio sources (also known as the "near end") and loudspeakers for presenting audio from a remote location (also known as the "far end"). For example, persons in a conference room may be conducting a conference call with persons at a remote location. Typically, speech and sound from the conference room may be captured by microphones and transmitted to the remote location, while speech and sound from the remote location may be received and played on loudspeakers in the conference room. Multiple microphones may be used in order to optimally capture the speech and sound in the conference room.

In some cases, the microphones may pick up the speech and sound from the remote location that is played on the loudspeakers. In such situations, the audio transmitted to the remote location may include not only the speech and sound from the conference room, but also the speech and sound from the remote location, thus creating an undesirable echo for the persons at the remote location hearing their own speech and sound. If there is no correction, the audio transmitted to the remote location may therefore be low quality or unacceptable due to this echo.

Some existing communication systems utilize echo cancellation techniques to minimize, or cancel out, the echo in the mixed audio signal. For example, some systems utilize an acoustic echo canceller for each of the multiple microphones, and a mixer to subsequently mix and process each echo-cancelled microphone signal. However, these types of systems may be computationally intensive and complex. For example, separate and dedicated processing may be needed to perform acoustic echo cancellation on each microphone signal. Other systems place an acoustic echo canceller after the mixer. However, some such systems work poorly due to the need to constantly re-adapt to the mixed signal generated by the mixer, specifically where the mixer is dynamic and therefore, the gains on one or more of the mixer channels changes over time.

Accordingly, there is an opportunity for improved techniques that address these concerns.

SUMMARY

The invention is intended to solve the above-noted problems by providing systems and methods designed to automatically adjust a gain of a reference input channel that is fed into a mixer for generating a mixed audio signal based on near end audio signals, wherein the reference input channel provides a far end audio signal to the mixer for gate-inhibit purposes.

One example embodiment provides a system, comprising a plurality of microphone elements, each microphone element configured to detect sound and convert the sound to a near end audio signal; at least one audio output device configured to output a far end audio signal comprising sound captured at a remote location; an audio mixer having a plurality of audio input channels for receiving audio signals captured by the plurality of microphone elements and a reference channel for receiving the far end audio signal as a reference signal; and a reference gain adjuster configured to automatically determine a gain amount for the reference channel based on an echo level detected in an input audio signal received at a given audio input channel.

Another example embodiment provides a method of automatically adjusting a reference gain of an audio mixer having a reference channel for receiving a far end audio signal from a remote location as a reference signal and a plurality of audio input channels for receiving audio signals captured by a plurality of microphone elements, the method comprising determining an echo level in an input audio signal received at a given audio input channel; and automatically determining a gain amount for the reference channel based on the echo level.

These and other embodiments, and various permutations and aspects, will become apparent and be more fully understood from the following detailed description and accompanying drawings, which set forth illustrative embodiments that are indicative of the various ways in which the principles of the invention may be employed.

DETAILED DESCRIPTION

The description that follows describes, illustrates, and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale and in some instances, proportions may have been exaggerated to more clearly depict certain features. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

Figure 1:
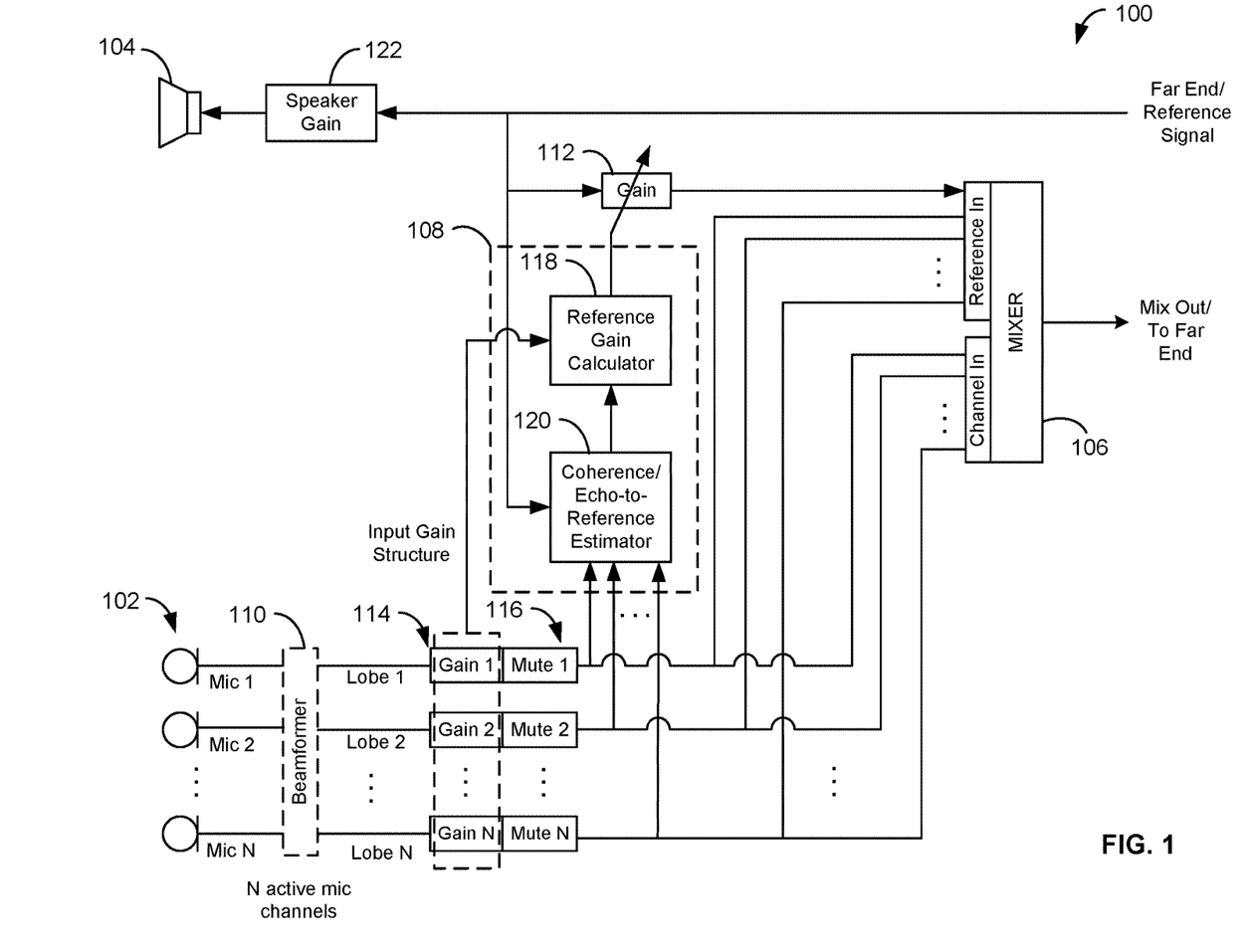
FIG. 1 is a schematic diagram of a communication system including an automatic reference gain adjustment module, in accordance with some embodiments.

FIG. 1 is a schematic diagram of a communication system 100 comprising a plurality of microphones 102 for capturing sound from one or more audio sources in an environment (also referred to herein as "near end audio"), a loudspeaker 104 for presenting audio received from a remote location (also referred to herein as "far end audio"), and an audio mixer 106 for generating a mix of the near end audio for sending to the remote location. For example, environments such as conference rooms may utilize the communication system 100 to facilitate communication with persons situated at the remote location, which may be another room, building, city, or any other area that is separate from the given environment. The components of the communication system 100 may be in communication with each other using wired and/or wireless connections. In the latter case, the communication system 100 may further include a communications module for enabling wireless communication between various components of the communication system 100 itself, and/or to facilitate wireless communication with the remote location.

The types of microphones 102 and their placement in a particular environment may depend on the locations of the audio sources, physical space requirements, aesthetics, room layout, and/or other considerations. For example, in some environments, the microphones 102 may be placed on a table or lectern near the audio sources. In other environments, the microphones 102 may be mounted overhead to capture the sound from the entire room, for example. The communication system 100 may work in conjunction with any type and any number of microphones 102.

Various components included in the communication system 100 may be implemented using software executable by one or more servers or computers, such as a computing device with a processor and memory, by hardware (e.g., discrete logic circuits, application specific integrated circuits (ASIC), programmable gate arrays (PGA), field programmable gate arrays (FPGA), etc.), or using a combination software and hardware.

Figure 2:
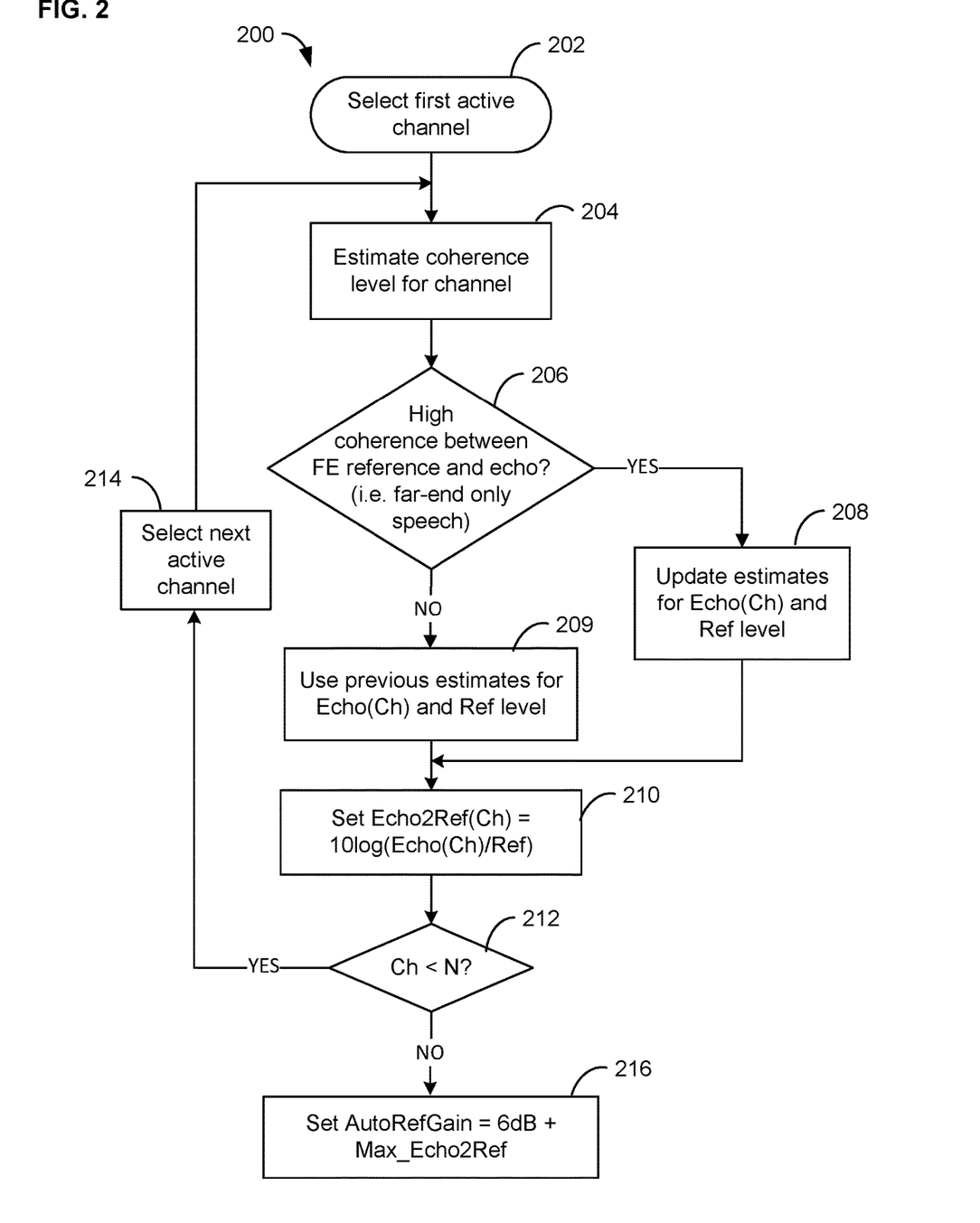
FIG. 2 is a flowchart illustrating operations for performing automatic reference gain adjustment using the communication system of FIG. 1, in accordance with some embodiments.
Figure 3:
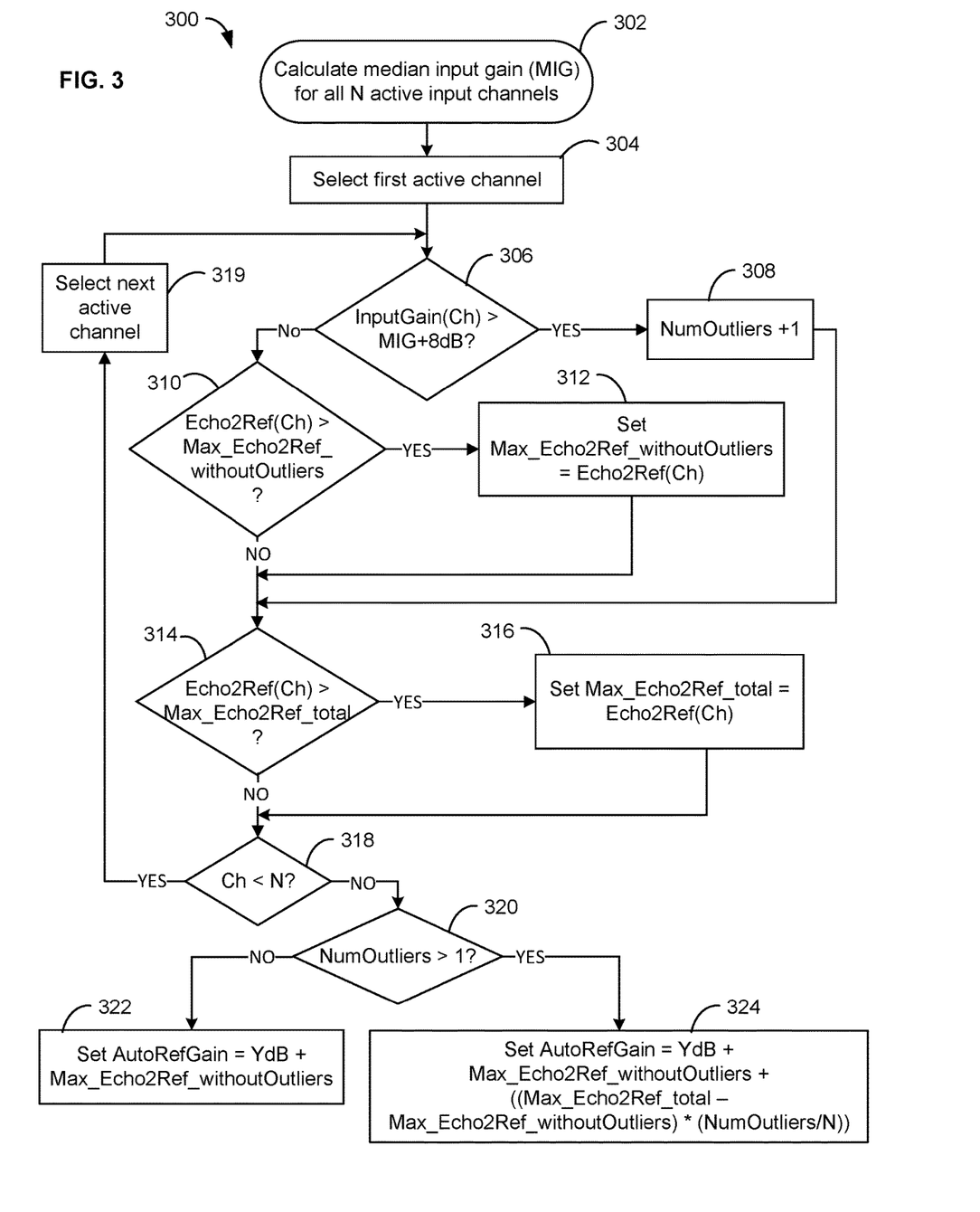
FIG. 3 is a flowchart illustrating operations for performing automatic reference gain adjustment when one or more microphone inputs are boosted, using the communication system of FIG. 1, in accordance with some embodiments.

FIGS. 2 and 3 illustrate exemplary processes for utilizing the communication system 100, in accordance with embodiments. In particular, FIG. 2 illustrates a process 200 for automatically adjusting a gain of a reference input signal representing far end audio, using the communication system 100, and FIG. 3 illustrates a method 300 for performing automatic reference gain adjustment when one or more of microphone inputs are boosted, or have an extra gain structure, using the communication system 100. One or more processors and/or other processing components within the communication system 100 may perform any, some, or all of the steps of each of the processes 200 and 300. One or more other types of components (e.g., memory, input and/or output devices, transmitters, receivers, buffers, drivers, discrete components, etc.) may also be utilized in conjunction with the processors and/or other processing components to perform any, some, or all of the steps of each of the processes 200 and 300. In general, a computer program product in accordance with the embodiments includes a computer-usable storage medium (e.g., standard random access memory (RAM), an optical disc, a universal serial bus (USB) drive, or the like) having computer-readable program code embodied therein, wherein the computer-readable program code is adapted to be executed by a processor (e.g., working in connection with an operating system) to implement the processes described herein. In this regard, the program code may be implemented in any desired language, and may be implemented as machine code, assembly code, byte code, interpretable source code or the like (e.g., via C, C++, Java, Actionscript, Objective-C, Javascript, CSS, XML, and/or others).

Referring now to FIG. 1, the communication system 100 can include the microphones 102, loudspeaker 104, audio mixer 106, and an automatic reference gain adjustment module 108. Each of the microphones 102 (also referred to herein as a "microphone element") can be configured to detect sound in the environment and convert the sound to an audio signal. In embodiments, some or all of the audio signals (also referred to herein as "near end audio signals") from the microphones 102 may be processed by a beamformer 110 to generate one or more beamformed audio signals (or lobes), as is known in the art. In such cases, the beamformed audio signals may be provided to the audio mixer 106 as input audio signals, as shown in FIG. 1. While the following description may refer to audio signals from microphones 102 for the sake of simplicity, it is contemplated that the techniques described herein may be utilized with any type of acoustic source or signal, including the beamformed audio signals (or lobes) generated by beamformer 110. The beamformer 110 may be any suitable beamformer, such as, e.g., a delay and sum beamformer, etc.

As shown in FIG. 1, the audio mixer 106 receives audio signals, or audio input signals, from the microphones 102 and/or the beamformer 110 at respective audio input channels and generates a mixed audio signal using the received audio signals. The mixed audio signal generated by the mixer 106 may conform to a desired audio mix such that the audio signals from certain microphones 102 are emphasized and the audio signals from other microphones 102 are deemphasized or suppressed, as described herein. Exemplary embodiments of audio mixers are disclosed in commonly-assigned patents, U.S. Pat. Nos. 4,658,425 and 5,297, 210, each of which is incorporated by reference in its entirety. In some embodiments, the mixed audio signal may be provided to an acoustic echo canceller (not shown) that is either included in, or coupled to, the communication system 100.

The loudspeaker 104 (also referred to herein as "audio output device") can be configured to output audio signals received from the remote location (e.g., via wired or wireless communication). The received audio signals (also referred to herein as "far end audio signals") may include speech and/or sound captured by microphones located at the remote location. Sometimes, one or more of the microphones 102 may pick up the far end audio as it is being played on the loudspeaker 104, in addition to the near end audio that is present in the environment. In such cases, if left unmitigated, the mixed audio signal may produce an undesirable echo due to persons at the remote location hearing their own speech and sound. One technique for minimizing this echo is to utilize a "gate-inhibit" technique that prevents the mixer 106 from outputting a mixed audio signal that includes the far end audio being played by the loudspeaker. This technique is achieved, at least in part, by providing the far end audio signal to a reference input channel of the mixer and adjusting a gain of the reference input channel so that the far end signal level is high enough to "win" against any "far end echoes" picked up by the microphones 102 and provided to the audio input channels of the mixer 106.

Existing reference gain adjustment systems require manual configuration by an installer while physically testing the environment for echo issues. Specifically, the installer manually boosts a gain of the reference input channel, for example, using a physical slider or other manual input device, until the gate inhibit feature of the mixer is activated. However, if the installer sets the gain too high, this may result in drowning out or suppressing the near end audio, particularly in double-talk situations, sluggish gating, and other undesirable effects. Thus, the effectiveness of existing systems depends greatly on the skill level of the installer or operator.

The communication system 100 shown in FIG. 1 includes an automatic reference gain adjustment module 108 configured to automatically adjust a gain amount applied to the reference input channel of the mixer 106 for receiving the far end audio signal transmitted by the remote location, based on one or more inputs from the communication system 100. According to embodiments, this gain amount (also referred to herein as "reference gain") can be controlled using a reference gain 112, or reference gain device, which may be implemented in hardware (e.g., an amplifier or the like), software, or a combination thereof. Thus, the communication system 100 can precisely control the far end reference gain so as to mitigate an echo in the mixed audio signal provided to the remote location.

As shown in FIG. 1, the mixer 106 may have a plurality of audio input channels (e.g., N channels) for receiving audio signals captured by a plurality of microphones 102 (e.g., N or more microphones), a corresponding plurality of reference input channels (e.g., N channels) for receiving the same audio signals (e.g., to help the mixer 106 avoid reverberation and other undesirable effects due to multiple microphones picking up the same audio source), and an additional reference input channel for receiving the audio signal received from the remote location (i.e. the far end reference input channel). Based on the N+1 reference input channels (or "reference channels"), the mixer 106 selects mixer-matrix gains for each of the N channel inputs (i.e. the near end audio signals), such that the channels considered "active" are gated-on (e.g., by applying a gain of 0 dB) and the remaining channels, i.e. those considered "inactive," [or] are gated-off (e.g., by applying a low gain or attenuation, such as −20 dB). The input gains 114 are applied to all channel inputs, and the mixed output, or mixed audio signal, is obtained based on the selected combination of channel inputs and gains at the mixer 106. As described further below, when a far-end reference signal with sufficient gain is applied to the appropriate reference input channel of the mixer 106, the mixer 106 can gate-off select channel inputs, as needed, to prevent or minimize the presence of an echo in the mixed audio signal output by the mixer 106.

In the illustrated embodiment, each microphone 102 is coupled to, or corresponds to, a respective one of the audio input channels of the mixer 106. In other embodiments, the number of microphones 102 (i.e. "M" microphones) may exceed the number of audio input channels (i.e. M>N) and/or each audio input channel may be configured to receive a respective one of the plurality of beamformed audio signals (e.g., N signals) output by the beamformer 110, each beamformed audio signal including audio signals captured by multiple microphones 102.

As shown, each audio input channel has individually controllable gain and mute settings. The gain settings can be controlled using an input gain 114, or input gain device, that is coupled to each input channel of the mixer 106 and can be implemented using hardware (e.g., an amplifier or the like), software, or a combination thereof. Likewise, the mute settings can be controlled using a mute device 116 that is coupled to each input channel and can be implemented using hardware (e.g., a mute button or the like), software, or a combination thereof. In various embodiments, the gain devices 114 and/or the mute devices 116 may be included in the mixer 106, embedded in or coupled to the respective microphones 102, included in a separate component of the communication system 100, or a combination thereof.

The mute settings provide a mute status (e.g., muted or unmuted) of the audio input channel, or the microphone 102 coupled thereto, and based thereon, determine whether the corresponding audio input channel is active or inactive. Specifically, if a given microphone 102 is unmuted, the corresponding input channel will be deemed "active." If, on the other hand, a given audio input channel or microphone 102 is muted, the audio input channel will be deemed "inactive." In embodiments, muted or inactive input channels do not contribute to calculation of a median gain or "outliers" and thus, may not participate in the algorithm decision making described herein, for example, with respect to FIG. 3.

The input gain settings can be used to emphasize or de-emphasize certain active microphone(s) (e.g., the chairperson of a meeting) or audio input channels, while keeping the rest of the active microphones or channels at the same gain level. Since input gain levels affect the overall gain structure of the audio input channels, the input gain settings may be referred to as an input gain structure of the microphones 102. As shown in FIG. 1, the input gain structure is provided as an input to the automatic reference gain adjustment module 108 for calculating echo-to-reference estimates and the final reference gain 112, as described in further detail herein.

In embodiments, the input gain settings enable one or more active channels to be gated-on, or emphasized, more easily by the mixer 106. For example, if the input gain 114 for a first channel is increased or set to a higher level than that of the other channels, and audio at substantially similar sound levels are simultaneously received across multiple channels, including the first channel, the mixer 106 will perceive the first channel as having a higher gain level than the other channels and accordingly, will select, or gate-on, the first channel. As will be appreciated, decreasing the input gain 114 of a given channel can have the opposite effect, thus de-emphasizing the channel having a lower input gain level.

In some embodiments, the input gain for each microphone 102, or audio input channel, is a static setting that is either controlled manually by the installer or operator, or automatically set using an algorithm. For example, in a conference room situation, the input gain settings may be configured to emphasize the microphone 102 located at the head of the room or table. In other embodiments, the input gain is a flexible setting that can be adjusted for each meeting or event. For example, a select input gain 114 may be configured so that the microphone 102 being used by a specific speaker or participant is emphasized (or given preference), irrespective of their location in the room or table seat. In another example, each input gain 114 may be set to an equal gain level for one event, and a different combination of gain levels for another event. As will be appreciated, in the case of flexible input gain settings, the reference gain settings are adjusted accordingly.

As described herein, the mixer 106 can be configured to use a "gate-inhibit" technique, or algorithm, to prevent the audio input channels from "gating on," or being activated, when they pick up the audio being played by the loudspeaker 104 (i.e. an echo). This involves boosting a gain of the far end reference input channel so that, when the far end signal is playing on the loudspeaker 104, the far end reference channel is the only channel that is gating on, and the remaining audio input channels are "gate-inhibited," or prevented from gating on.

Typically, gating decisions are made by comparing an energy level (e.g., decibel level) of a given audio input channel to a current maximum energy level, e.g., the highest energy level of all input channels for a preset duration of time (e.g., 400 milliseconds), to determine whether the corresponding microphone 102 is picking up audio from an audio source, as will be appreciated. If the energy level is sufficiently high enough (e.g., equal to 90% or more of the maximum level), the audio input channel becomes active and, for example, a lobe is pointed towards the audio source (e.g., talker). To prevent the microphones 102 from gating on in response to picking up the loudspeaker audio, the audio input channels are additionally compared to the far end reference channel during a gating decision. If the signal level of a given audio input channel does not exceed a signal level of the far end reference channel, i.e. due to the audio input channel picking up the loudspeaker audio instead of the audio sources in the environment, the far end reference channel will "win" the gating decision, and the audio input channel will not be activated. However, since the far end reference channel is not actually a physical output channel, no outputs are provided to the mixer 106 for generating the mixed audio signal. In this manner, the far end audio can be prevented from causing audio input channels connected to the mixer 106 from gating on and creating an echo in the mixed audio signal.

The automatic reference gain adjustment module 108 (also referred to herein as a "reference gain adjuster") can improve the functionality of this gate inhibit technique by automatically selecting an appropriate gain amount for the reference gain device 112 coupled to the far end reference input channel (or far end reference channel) based on an echo signal detected at one or more audio input channels (or audio channels), so that the far end audio signal "wins" the gating decision each time the microphones 102 pick up the audio playing on the loudspeaker 104 (i.e. an echo). In this manner, the reference gain amount can be configured to remove the echo signal from, or reduce a contribution of the echo signal to, the input audio signals before the audio mixer 106 generates the mixed audio signal for sending to the remote location. To achieve this, the reference gain adjuster 108 utilizes a reference gain calculator 118 and a coherence estimator 120 (also referred to herein as an "echo-to-reference estimator"), which may be included in the adjustment module 108, as shown in FIG. 1. In various embodiments, the reference gain adjuster 108 may be included in the mixer 106, provided as a separate component of the communication system 100, or a combination thereof. In some embodiments, the coherence estimator 120 may be part of an acoustic echo canceller (AEC) coupled to or included in the system 100, or may be configured to receive coherence information from the AEC.

According to embodiments, the reference gain calculator 118 is configured to calculate or determine an appropriate value or level for the reference gain 112 based on an echo-to-reference ratio received from the coherence estimator 120 and, in at least some cases, the input gain structure received from the input gain devices 114 (e.g., as described with reference to FIG. 3). The coherence estimator 120 is configured to determine the echo-to-reference ratio based on an echo level detected in the audio signal received at a given audio input channel. More specifically, the coherence estimator 120 may be configured to compare the reference signal to the near end audio signal to detect the presence of an echo, or echo signal, and determine a level of coherence based on the echo signal and the reference signal, and if there is high coherence, determine the echo-to-reference ratio for the given audio input channel by estimating an energy level of the echo signal (or "echo level") and an energy level of the reference signal (or "reference level").

The reference gain adjuster 108 is further configured to determine which active audio input channel has the highest (or worst) echo-to-reference ratio and use that highest ratio to determine the gain amount applied by the reference gain 112 to the far end reference input channel. More specifically, the reference gain calculator 118 is configured to automatically adjust or set the reference gain amount to a preset value that is a predetermined number of decibels (dB) higher than the highest echo-to-reference ratio. For example, in at least one embodiment, the reference gain calculator 118 calculates the reference gain amount by adding 6 dB to the highest echo-to-reference ratio determined for the active audio input channels. In this manner, the calculated reference gain will be high enough to "defeat" any echo signals present in the audio input channels of the mixer 106, but not so high that it would prevent the audio input channels from gating on when there is speech at the near end (e.g., a double-talk situation).

Referring now to FIG. 2, the above-described technique for automatically adjusting reference gain may be implemented using exemplary method or process 200, in accordance with embodiments. For example, process 200 may be performed by one or more components of the communication system 100, including the reference gain adjuster 108. Accordingly, process 200 will be described below with reference to the communication system 100 of FIG. 1.

As shown, the process 200 may begin at block 202 by selecting a first one of the N active audio input channels. As described herein, each audio input channel may have a mute setting that determines whether the channel is identified as "active" or "inactive" (e.g., an unmuted or muted status of the mute device 116, respectively). In embodiments, the reference gain adjuster 108 is configured to calculate echo-to-reference ratios for all active audio input channels, or otherwise analyze only the active audio channels for echo signals. Accordingly, block 202 may also include determining whether a given audio channel is active or inactive based on a mute setting associated with that channel.

At block 204, the coherence estimator 120 estimates or calculates a coherence level for the given active audio input channel, or how much of the audio signal received at the input channel is due to the far end audio signal (i.e. corresponds to echo) versus the near end audio signal. For example, the coherence estimator 120 may determine the coherence level by comparing the reference signal to the input audio signal using cross-correlation techniques or other suitable coherence computation involving the signal envelope and/or Fourier Transform of each signal. The coherence level may be a cross-correlation coefficient or other suitable metric obtained using said techniques.

Once the coherence level is estimated for the first channel, the process 200 continues to block 206 where the coherence estimator 120 determines whether there is high coherence between the input audio signal and the reference signal. For example, high coherence may be found if the coherence level calculated at step 204 is greater than a preset threshold (e.g., 80%). In embodiments, a high level of coherence can indicate that only the far-end audio is present in the audio signal received at the given input channel, i.e. the input audio signal only or mostly contains a far end echo (or echo signal) and/or no near end audio is present in the environment (e.g., because the near end talkers are presumably silent). A low level of coherence can indicate that the input audio signal is most likely due to near-end talkers (i.e. no or very little far-end echo is present in the environment). A medium level of coherence can indicate the presence of "double-talk" in the input audio signal (i.e. both near end audio and far end audio are present in the environment).

If there is high coherence between the two signals at block 206 (i.e. the input audio signal primarily contains a far-end echo), the input audio signal is treated as the "echo signal," and the process 200 continues to block 208, where the coherence estimator 120 calculates a new estimate for the echo level ("Echo(Ch)") based on an energy level of the input audio signal (which is the sum of the far-end echo and near-end speech, if any) and a new estimate for the reference level ("Ref") based on an energy level of the reference signal (i.e. the far end audio). If, on the other hand, high coherence is not found at block 206 (i.e. the coherence level is determined to be medium or low), the process 200 continues to block 209, where the coherence estimator 120 uses or retrieves previous estimates for the echo level and reference level. That is, at block 208, the Echo(Ch) and Ref levels are updated based on current estimates, while at block 209, the Echo(Ch) and Ref levels remain at previously calculated values, i.e. are not adjusted or re-calculated.

In embodiments, the process 200 may be an iterative process that improves over time as the estimates calculated at block 208, and therefore, the final auto reference gain amount, becomes more accurate. In such cases, when the process 200 is initialized or executed for the first time, a set of initial values may be assigned to each of the echo level and the reference level (e.g., −60 dB or other small positive value) and the determination at block 206 may necessarily be "no" (i.e. no high coherence). The initial values may be replaced with newly estimated values for the echo and reference levels after the coherence estimator 120 first identifies the existence of high coherence at block 206. The estimated values may be stored in a memory of the system 100 and continuously updated at block 208 each time high coherence is found at block 206. When high coherence is not found, the last set of estimates may be used at block 209 as the echo level and reference level for the current auto reference gain calculation. In this manner, the reference gain amount can remain high enough to offset future echo situations, even if a current situation does not contain an echo.

In embodiments, the echo level and reference level estimates may be calculated using respective exponentially weighted first order moving average equations, namely:

Echo(Ch)=A*Echo(Ch)+(1−A)*AVG_ECHO_ENERGY

Ref=A*Ref+(1−A)*AVG_REF_ENERGY

In the above equations, the parameter "A" is a smoothing factor, such as, for example, a discrete-time equivalent of a time constant (for a low-pass first order filter). This parameter, along with the first order moving average equations, may be used to smooth out the energy estimates over time and prevent sudden and/or random jumps in the estimates. In other embodiments, other suitable equations or energy estimators may be used to smooth out the energy estimates, such as, for example, a different smoothing method or a higher-order low pass filter.

From either block 208 or 209, the process 200 continues to block 210. At block 210, an echo-to-reference level, or ratio, for the given channel ("Echo2Ref (Ch)") is calculated by converting a ratio of echo level to reference level (Echo (Ch)/Ref) to decibel (dB) units using the equation: 10*log (Echo (Ch)/Ref). As should be appreciated, the exact values used for "Echo (Ch)" and "Ref" at block 210 will vary depending on whether or not these values were updated at block 208.

At block 212, the coherence estimator 120 determines whether there are more channels to analyze. If there are (i.e. Ch<N), the next channel is selected at block 214 and blocks 204 through 210 are repeated for that channel. This continues until an echo-to-reference ratio has been calculated for each remaining active audio channel, or all N active channels have been analyzed (i.e. Ch=N).

Once all active channels have been analyzed, the process 200 further includes, either at block 216 or just prior to block 216, comparing the echo-to-reference ratios calculated for the N active channels using the coherence estimator 120 to determine which audio input channel has the highest echo-to-reference ratio ("Max Echo2Ref"). In some embodiments, the coherence estimator 120 provides the echo-to-reference ratio estimated for each audio channel to the reference gain calculator 118, and the reference gain calculator 118 determines which of the received ratios is the highest. In other embodiments, the coherence estimator 120 determines which echo-to-reference ratio is the highest and provides only the highest ratio to the reference gain calculator 118.

At block 216, the reference gain calculator 118 calculates a reference gain amount using the highest echo-to-reference ratio. In particular, the reference gain calculator 118 sets or adjusts the reference gain to a preset value (e.g., 6 dB) above the highest echo-to-reference ratio (i.e. AutoRefGain=6 dB+Max_Echo2Ref). The reference gain calculator 118 then uses the final reference gain amount to adjust the gain 112 applied to the far end reference channel.

In process 200, it is assumed that all input gains 114 are set to the same value or level and therefore, it is sufficient to use the worst case scenario, i.e. the highest echo-to-reference ratio among all active audio channels, to determine the reference gain amount. However, in cases where there is an extra gain structure, or boost, for certain input channels (referred to herein as "outliers"), the appropriate reference gain for the far end reference input channel must be adjusted to "defeat" the outliers. In such cases, process 300 shown in FIG. 3 may be used to calculate the reference gain amount.

Referring now to FIG. 3, process 300 is configured for performing automatic reference gain adjustment when one or more of the microphone input gains (e.g., input gains 114 in FIG. 1) are boosted, or has a specific input gain setting that affects the echo-to-reference level estimate for that channel. The process 300 may be performed by one or more components of the communication system 100, such as the reference gain adjuster 108 shown in FIG. 1, in accordance with embodiments. The input gain "outliers" may exist because, for example, the installer manually boosted the input gain 114 of one or more audio input channels (e.g., to boost the microphone 102 located at the head of the room, etc.).

In various embodiments, the process 300 may begin after completing block 216 of the process 200 shown in FIG. 2. Namely, once the echo-to-reference ratios are calculated for all N active channels, and a maximum echo-to-reference ratio is determined and provided to the reference gain calculator 118, the process 300 may begin at block 302 with the reference gain calculator 118 receiving an input gain structure of the audio input channels from the input gains 114 shown in FIG. 1, and calculating a median input gain ("MIG") for all N active input channels based on these input gain amounts.

At block 304, the reference gain calculator 118 selects a first active audio input channel. At block 306, the reference gain calculator 118 scans or analyzes the selected channel in order to determine whether the channel is an outlier, or a channel whose input gain 114 is set to a level that is higher than the sum of MIG and XdB (where X is typically 8). If the determination at block 306 is "yes," a counter for the number of outliers (NumOutliers) is incremented by 1 at block 308, and the process 300 goes directly to block 314. If the determination at block 306 is "no," the process 300 continues to block 310.

At block 310, the reference gain calculator 118 determines whether the echo-to-reference level for the given channel ("Echo2Ref(Ch)") is greater than a maximum echo-to-reference level estimate over all channels but excluding outlier channels (denoted as "Max_Echo2Ref_withoutOutliers"). If the answer is "yes," the process 300 continues to block 312, where the Max_Echo2Ref_withoutOutliers estimate is set equal to the echo-to-reference level for the given channel. From block 312, the process 300 continues to block 314. If the answer at block 310 is "no," the process 300 goes directly to block 314.

At block 314, the reference gain calculator 118 determines whether the echo-to-reference level for the given channel ("Echo2Ref(Ch)") is greater than a maximum echo-to-reference estimate over all channels, including outlier channels (denoted as "Max_Echo2Ref_total"). If the answer is "yes," the process 300 continues to block 316, where the Max_Echo2Ref_total estimate is set equal to the echo-to-reference level for the given channel. From block 316, the process 300 continues to block 318. If the answer at block 314 is "no," the process 300 goes directly to block 318. In embodiments, the initial values for Max_Echo2Ref_withoutOutliers and Max_Echo2Ref_total may be set to $-\infty$ dB.

At block 318, the reference gain calculator 118 determines whether there are any other active audio input channels (i.e. CH<N). If there are, process 300 continues to block 319, where the next active channel is selected and blocks 306 through 316 are repeated for that channel. This loop may continue until there are no more active channels remaining (i.e. CH=N or the determination at block 318 is "no"), at which point the process 300 continues to block 320.

At block 320, if there is only one input channel with a very high input gain (i.e. NumOutliers=1, or only one outlier channel), the process 300 continues to block 322, where the reference gain ("AutoRefGain") is automatically set to YdB higher than the Max_Echo2Ref_withoutOutliers estimate (where Y is typically 6), thus basically ignoring the outlier channel. This may be preferred in embodiments so as to not allow the outlier channel with the high input gain to set the reference gain to a value that is too high, as that would make it very difficult for near-end talkers to "break in," or for the near end audio to be picked up by the mixer 106.

If there is more than one outlier channel at block 320 (i.e. NumOutliers>1), the process 300 continues to block 324, where the reference gain ("AutoRefGain") is calculated using the following equation:

AutoRefGain=YdB+Max_Echo2 Ref_withoutOutliers+((NumOutliers/N)*(Max_Echo2 Ref_total-Max_Echo2 Ref_withoutOutliers)), where Y is typically 6. In other words, the reference gain is linearly increased based on the number of outliers when there is more than one outlier. This allows the channels with high input gains to at least somewhat raise the amount of reference gain that is automatically applied.

The process 300 may end once the reference gain amount calculated at blocks 322 or 324 is applied to the reference gain 112 of the reference input channel. In this manner, the echo signal can be removed from the near end audio signals before a mixed audio signal is generated by the audio mixer 106 based on the near end audio signals.

Referring back to FIG. 1, the communication system 100 may also include a speaker gain 122 for controlling a gain level of the loudspeaker 104. The speaker gain 122 may affect the overall gain structure of the input channels and the "Echo2Ref" ratios estimated in method 200, as well as the final value of the reference gain calculated by either of the methods 200 and 300. According to embodiments, the speaker gain 122, or speaker gain device, may be implemented in hardware (e.g., an amplifier or the like), software, or a combination thereof.

Thus, systems and methods are provided herein that can mitigate an echo in a mixed audio signal provided to a remote location, wherein the mixed audio signal is generated by a mixer using audio signals captured by microphones in an environment that further includes a loudspeaker for playing a far end audio signal received from the remote location. The microphones can be prevented from contributing far end audio to the mixed audio signal by automatically adjusting a gain applied to a far end reference input channel that is used by the mixer to determine whether the audio channels should be activated due to detection of near end audio.

While embodiments shown and described herein include multiple audio input channels, other embodiments may include a communication system with a single audio input channel. Also, though a particular audio communication system is shown and described herein, other embodiments may include any type of system with multiple, or single, input channels and a reference input channel for controlling gating decisions based on a contribution of the reference signal in the environment. For example, the techniques described herein may be used in other situations where setting the reference gain automatically to an appropriate level can help determine the activity/contribution of the reference signal in the near-end signal (mix), and can allow the mixer decisions to be used to temporarily inhibit, disable, enable, or otherwise control other types of actions or mechanisms, such as, for example, voice, noise, and/or disturbance activity detectors in the near end, which attempt to determine if near end sounds in the room represent talkers or noise but should not do so if the near-end source of sound is associated with an echo; automatic focus of existing lobes, which attempts to better focus a beam to the exact position of the near-end talker in the room, but should not do so if the near-end source of sound is associated with an echo; and/or automatic placement of various lobes, which attempts to initially place a beam or lobe towards the position of the near-end talker in the room, but should not do so if that near-end source of sound is associated with an echo. Examples of such other systems are disclosed in commonly-assigned patent application U.S. Ser. No. 16/887,790 and U.S. Ser. No. 16/826,115, each of which is incorporated by reference in its entirety.

Any process descriptions or blocks in the figures, such as, e.g., FIGS. 2 and 3, should be understood as representing modules, segments, or portions of code which include one or more executable instructions for implementing specific logical functions or steps in the process, and alternate implementations are included within the scope of the embodiments of the invention in which functions may be executed out of order from that shown or discussed, including substantially concurrently or in reverse order, depending on the functionality involved, as would be understood by those having ordinary skill in the art.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

What is claimed is:

1. A system comprising:
   at least one processor; and
   a memory configured to store instructions that, when executed by the at least one processor, cause the at least one processor to:
   receive, in a reference channel, a far end audio signal as a reference signal;
   receive, in a plurality of audio input channels, respective near end audio signals from a plurality of microphone elements;
   determine an echo level in a first audio input channel of the plurality of audio input channels by:
   determining a coherence level based on the far end audio signal and a first near end audio signal received in the first audio input channel, and
   based on the coherence level being greater than a preset threshold, using a signal energy level of the first near end audio signal as the echo level in the first audio input channel;
   automatically determine a reference gain amount for the reference channel based on the echo level in the first audio input channel;
   apply the reference gain amount to the far end audio signal prior to receipt in the reference channel as the reference signal; and
   make gating decisions for the plurality of audio input channels by comparing each of the plurality of audio input channels to the reference channel.

2. The system of claim 1, wherein the far end audio signal and the near end audio signals are received at substantially the same time, and making the gating decisions comprises: preventing a given audio input channel from gating on based on a signal energy level of the near end audio signal received in the given audio input channel being lower than a signal energy level of the reference signal received in the reference channel.

3. The system of claim 1, wherein automatically determining the reference gain amount comprises determining the reference gain amount using an echo-to-reference ratio calculated based on the echo level and a reference level determined based on the far end audio signal.

4. The system of claim 1, wherein automatically determining the reference gain amount comprises determining the reference gain amount based further on an input gain structure of the plurality of audio input channels, each audio input channel having an individually-controllable input gain setting.

5. The system of claim 1, wherein the instructions, when executed, further cause the at least one processor to:
   receive, in an audio channel and based on detection of audio at a new location, an audio signal captured by the plurality of microphone elements, wherein the audio signal and the far end audio signal are received at substantially the same time;
   determine a coherence level based on the audio signal and the far end audio signal; and
   based on the coherence level being greater than a preset threshold and a signal energy level of the audio signal being lower than a signal energy level of the reference signal received in the reference channel, prevent the audio channel from gating on.

6. The system of claim 1, wherein the instructions, when executed, further cause the at least one processor to:
   determine a coherence level based on the far end audio signal and the near end audio signal received in a given audio input channel, the far end audio signal and said near end audio signal being received at substantially the same time; and
   prevent adjustment of a microphone lobe associated with the given audio input channel based on the coherence level being greater than a preset threshold and a signal energy level of the near end audio signal received in the given audio input channel being lower than a signal energy level of the reference signal received in the reference channel.

7. A method of automatically adjusting a reference gain for a reference channel of a channel selector further comprising a plurality of audio input channels for receiving respective near end audio signals captured by a plurality of microphone elements, the reference channel receiving a far end audio signal as a reference signal, the method comprising:
   determining an echo level in a first audio input channel of the plurality of audio input channels by:
   determining a coherence level based on the far end audio signal and a first near end audio signal received in the first audio input channel, and
   based on the coherence level being greater than a preset threshold, using a signal energy level of the first near end audio signal as the echo level in the first audio input channel;
   determining a reference gain amount for the reference channel based on the echo level in the first audio input channel;
   applying the reference gain amount to the far end audio signal prior to receipt in the reference channel as the reference signal; and making gating decisions for the plurality of audio input channels by comparing each of the audio input channels to the reference channel.

8. The method of claim 7, wherein the far end audio signal and the near end audio signals are received at substantially the same time, and making the gating decisions comprises: preventing a given audio input channel from gating on based on a signal energy level of the near end audio signal received in a given audio input channel being lower than a signal energy level of the reference signal received in the reference channel.

9. The method of claim 7, wherein determining the reference gain amount comprises:
calculating an echo-to-reference ratio using the echo level and a reference level determined based on the far end audio signal; and
determining the reference gain amount based on the echo-to-reference ratio.

10. The method of claim 9, wherein calculating the echo-to-reference ratio comprises:
calculating an individual echo-to-reference ratio for each of the plurality of audio input channels;
identifying the first one of the plurality of audio input channels as having a highest echo-to-reference ratio; and
using the highest echo-to-reference ratio as the echo-to-reference ratio for determining the reference gain amount.

11. The method of claim 7, wherein automatically determining the reference gain amount comprises determining the reference gain amount based further on an input gain structure of the plurality of audio input channels, each audio input channel having an individually-controllable input gain setting.

12. The method of claim 7, further comprising:
receiving, in an audio channel and based on detection of audio at a new location, an audio signal captured by the plurality of microphone elements, wherein the audio signal and the far end audio signal are received at substantially the same time;
determining a coherence level based on the audio signal and the far end audio signal; and
based on the coherence level being greater than a preset threshold and a signal energy level of the audio signal being lower than a signal energy level of the reference signal received in the reference channel, preventing the audio channel from gating on.

13. The method of claim 7, further comprising:
determining a coherence level based on the far end audio signal and the near end audio signal received in a given audio input channel, the far end audio signal and said near end audio signal being received at substantially the same time; and
preventing adjustment of a microphone lobe associated with a given audio input channel based on the coherence level being greater than a preset threshold and a signal energy level of the near end audio signal received in the given audio input channel being lower than a signal energy level of the reference signal received in the reference channel.

14. A system, comprising:
a channel selector comprising: a reference channel for receiving a far end audio signal as a reference signal, and a plurality of audio input channels for receiving respective near end audio signals from a plurality of microphone elements, the channel selector configured to make gating decisions for the plurality of audio input channels by comparing each of the audio input channels to the reference channel; and
a reference gain adjuster configured to:
determine an echo level in a first audio input channel of the plurality of audio input channels by:
determining a coherence level based on the far end audio signal and a first near end audio signal received in the first audio input channel, and
based on the coherence level being greater than a preset threshold, using a signal energy level of the first near end audio signal as the echo level in the first audio input channel;
automatically determine a reference gain amount for the reference channel based on the echo level in the first audio input channel, and apply the reference gain amount to the far end audio signal prior to receipt in the reference channel as the reference signal.

15. The system of claim 14, wherein making the gating decisions comprises preventing a given audio input channel from gating on based on a signal energy level of the near end audio signal received at the given audio input channel being lower than a signal energy level of the reference signal received in the reference channel, the channel selector receiving the far end audio signal and the near end audio signals at substantially the same time.

16. The system of claim 14, wherein the reference gain adjuster determines the reference gain amount using an echo-to-reference ratio calculated based on the echo level and a reference level determined based on the far end audio signal.

17. The system of claim 14, wherein the channel selector is an audio mixer configured to generate a mixed audio signal based on the near end audio signals received in the plurality of audio input channels.

* * * * *